US012637592B2

(12) United States Patent
Rim et al.

(10) Patent No.: US 12,637,592 B2
(45) Date of Patent: May 26, 2026

(54) PROTECTIVE FILM STRUCTURE AND ELECTRONIC DEVICE COMPRISING SAME

(71) Applicant: SAMSUNG ELECTRONICS CO., LTD., Suwon-si (KR)

(72) Inventors: Changmook Rim, Suwon-si (KR); Suyoung Seo, Suwon-si (KR); Hyeonbeom Kim, Suwon-si (KR); Jonghyun Lee, Suwon-si (KR); Hyunsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/679,075

(22) Filed: May 30, 2024

(65) Prior Publication Data

US 2024/0309244 A1 Sep. 19, 2024

Related U.S. Application Data

(63) Continuation of application No. PCT/KR2022/014475, filed on Sep. 27, 2022.

(30) Foreign Application Priority Data

Nov. 30, 2021 (KR) ........................ 10-2021-0168966

(51) Int. Cl.

| | |
|---|---|
| ***C09J 7/29*** | (2018.01) |
| ***C09J 7/38*** | (2018.01) |
| ***C09J 11/04*** | (2006.01) |

(52) U.S. Cl.

CPC . *C09J 7/29* (2018.01); *C09J 7/38* (2018.01); *C09J 11/04* (2013.01); *C09J 2301/16* (2020.08); *C09J 2301/204* (2020.08); *C09J 2483/00* (2013.01)

(58) Field of Classification Search

None

See application file for complete search history.

(56) References Cited

U.S. PATENT DOCUMENTS

2019/0033494 A1* 1/2019 Kim ........................ B32B 27/40

FOREIGN PATENT DOCUMENTS

| | | | | | |
|---|---|---|---|---|---|
| JP | 2011116940 | A | * | 6/2011 | ................ C09J 4/00 |
| JP | 2019-177644 | A | | 10/2019 | |
| KR | 10-1996-0000979 | B1 | | 1/1996 | |
| KR | 101320300 | B1 | * | 10/2013 | .............. C09J 11/00 |
| KR | 10-1596664 | B1 | | 3/2016 | |
| KR | 10-2016-0082478 | A | | 7/2016 | |
| KR | 10-2017-0121071 | A | | 11/2017 | |
| KR | 10-2017-0121889 | A | | 11/2017 | |
| KR | 10-1853387 | B1 | | 4/2018 | |

(Continued)

OTHER PUBLICATIONS

JP2011116940A Machine Translation via EPO (Year: 2011).*

(Continued)

*Primary Examiner* — Laura C Powers

(74) *Attorney, Agent, or Firm* — Sughrue Mion, PLLC

(57) ABSTRACT

A protective film of a display device includes: a hard coating layer; a transparent adhesive layer; a base layer between the hard coating layer and the transparent adhesive layer; and a primer layer between the transparent adhesive layer and the base layer, where the transparent adhesive layer comprises at least one of polysilazane or silazane.

13 Claims, 12 Drawing Sheets

(56) References Cited

FOREIGN PATENT DOCUMENTS

| | | | |
|---|---|---|---|
| KR | 10-1874616 | B1 | 7/2018 |
| KR | 10-1908186 | B1 | 10/2018 |
| KR | 10-2019-0014233 | A | 2/2019 |
| KR | 10-2019-0023335 | A | 3/2019 |
| KR | 10-2020-0038141 | A | 4/2020 |
| KR | 10-2020-0096528 | A | 8/2020 |
| KR | 10-2232514 | B1 | 3/2021 |
| KR | 10-2376545 | B1 | 3/2022 |

OTHER PUBLICATIONS

KR20170121889A Machine Translation via EPO (Year: 2017).*
KR 20190014233 Machine Translation via EPO (Year: 2019).*
KR101320300B1 Machine Translation via EPO (Year: 2013).*
International Search Report (PCT/ISA/210) issued Dec. 27, 2022 by the International Searching Authority in International Patent Application No. PCT/KR2022/014475.
Written Opinion (PCT/ISA/237) issued Dec. 27, 2022 by the International Searching Authority in International Patent Application No. PCT/KR2022/014475.

* cited by examiner

PROTECTIVE FILM STRUCTURE AND ELECTRONIC DEVICE COMPRISING SAME

CROSS REFERENCE TO RELATED APPLICATION(S)

This application is a continuation of International Application No. PCT/KR2022/014475, filed on Sep. 27, 2022, in the Korean Intellectual Property Receiving Office, which is based on and claims priority to Korean Patent Application No. 10-2021-0168966, filed on Nov. 30, 2021, in the Korean Intellectual Property Office, the disclosures of which are incorporated by reference herein in their entireties.

BACKGROUND

1. Field

This disclosure relates to a protective film structure and an electronic device including the same.

2. Description of Related Art

An electronic device performs a specific function according to a loaded program, and may include as a home appliance, an electronic note, a portable multimedia player, a mobile communication terminal, a tablet personal computer (PC), a video/audio device, a desktop/laptop computer, a vehicle navigation system, and the like. For example, such electronic devices may output stored information as sound or images. As electronic devices have become highly integrated, and high-speed and high-volume wireless communication has come into wider use, various functions have been mounted in a single electronic device such as a mobile communication terminal. For example, an entertainment function, such as gaming, a multimedia function, such as music/video play, a communication and security function for mobile banking, a scheduling function, or an electronic wallet function as well as a communication function have been integrated into a single electronic device.

Among the electronic devices, a display device provides a user with information by displaying various images on a display screen. The display device generally displays information within an assigned screen. Recently, flexible display devices including a foldable, bendable, or rollable flexible display panel have been developed. The flexible display devices may be folded, rolled, or bent, unlike rigid display devices. The flexible display devices, which may be changed in shape, may be carried regardless of the existing screen size, thereby improving user convenience.

A protective film may be used to prevent damage or scratches on a surface of an electronic device caused by a user. The damage on the surface of the electronic device may occur due to various reasons such as falling of the electronic device. The protective film may be used to prevent such damage on the surface of the electronic device.

It may be difficult for a protective film applied to a flexible display to achieve a surface hardness equal to or higher than a glass level and flexibility at the same time.

SUMMARY

Provided is a protective film structure including a high-strength transparent adhesive, for achieving a high hardness of a hard coating layer and flexibility at the same time, and protecting a surface of a display.

Further, provided is an electronic device to which a protective film structure for protecting a display from external factors is applied.

Additional aspects will be set forth in part in the description which follows and, in part, will be apparent from the description, or may be learned by practice of the presented embodiments.

According to an aspect of the disclosure, a protective film of a display device may include: a hard coating layer; a transparent adhesive layer; a base layer between the hard coating layer and the transparent adhesive layer; and a primer layer between the transparent adhesive layer and the base layer, where the transparent adhesive layer includes at least one of polysilazane or silazane.

The transparent adhesive layer may have at least one of a thickness of 50 nm to 30 μm, an adhesion strength of 750 N/m or more, or a light transmittance of 80% or more.

The transparent adhesive layer may further include siloxane, where, in a state in which the transparent adhesive layer includes polysilazane, the polysilazane has a molecular weight of 1,500 g/mol or more.

At least a portion of the transparent adhesive layer may include a lattice pattern, where the lattice pattern has a line thickness of 100 nm to 10 μm, and where the lattice pattern includes at least one of a straight pattern, a diagonal pattern, and a geometric mesh pattern.

The primer layer may have a thickness of 0.1 μm to 5 μm, and the primer layer and the hard coating layer may include a first coating material.

The hard coating layer may have at least one of a thickness of 5 μm to 70 μm, a pencil hardness of 7 H or more, or a flexural strength of 2.0 R or more.

The hard coating layer may include a functional layer on a surface of the hard coating layer, inside the hard coating layer, or both on a surface of and inside the hard coating layer, and the functional layer may include an anti-fouling layer.

According to an aspect of the disclosure, a protective film structure may include: a hard coating layer; a transparent adhesive layer; and a base layer between the hard coating layer and the transparent adhesive layer, where the transparent adhesive layer includes nanoparticles and an adhesive.

The transparent adhesive layer may have at least one of a thickness of 50 nm to 10 μm, an adhesion strength of 750 N/m or more, or a light transmittance of 80% or more.

At least a portion of the transparent adhesive layer may include a lattice pattern, where the lattice pattern has a line thickness of 10 μm to 100 μm, and where the lattice pattern includes at least one of a straight pattern, a diagonal pattern, and a geometric mesh pattern.

The nanoparticles may include at least of silicon (Si), titanium (Ti), tantalum (Ta), zirconium (Zr), boron (B), aluminum (Al), magnesium (Mg), zinc (Zn), tin (Sn), cerium (Ce), vanadium (V), chromium (Cr), antimony (Sb), and oxides thereof.

The nanoparticles may have a particle size of 300 nm or less, and the adhesive may include nanoparticles in an amount of 1 part by weight to 10 parts by weight per 100 parts by weight of the adhesive.

The hard coating layer may have at least one of a thickness of 5 μm to 70 μm, a pencil hardness of 7 H or more, or a flexural strength of 2.0 R or more.

The hard coating layer may include a functional layer on a surface of the hard coating layer, inside the hard coating layer, or both on a surface of and inside the hard coating layer, and the functional layer may include an anti-fouling layer.

According to an aspect of the disclosure, an electronic device may include a flexible display; and a protective film structure provided on the display, wherein the protective film structure may include: a hard coating layer; a transparent adhesive layer; a base layer between the hard coating layer and the transparent adhesive layer; and a primer layer between the transparent adhesive layer and the base layer, and the transparent adhesive layer includes at least one of polysilazane or silazane.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
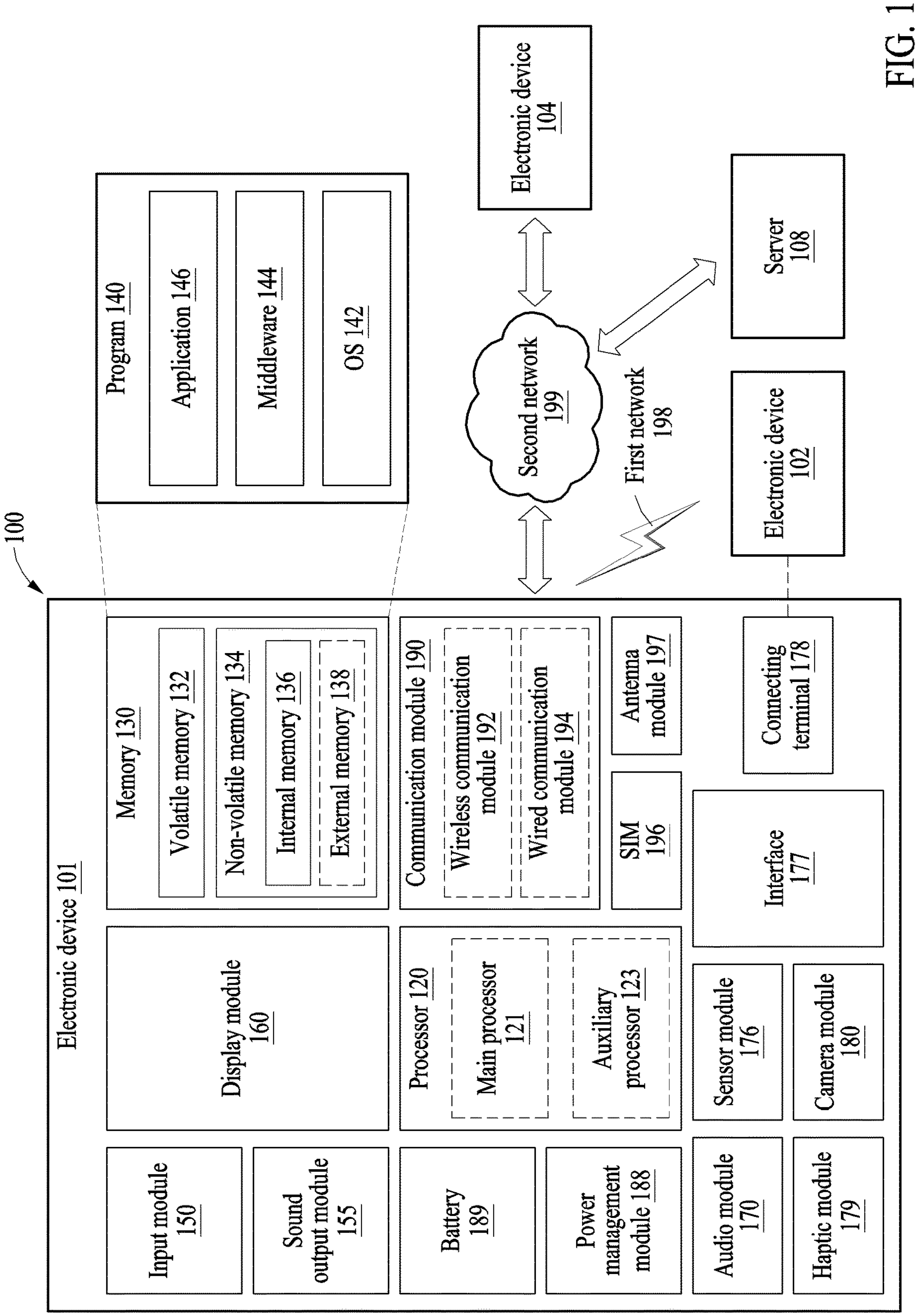
FIG. 1 is a block diagram illustrating an electronic device in a network environment according to one or more embodiments.

Hereinafter, embodiments will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise. The terms including technical or scientific terms used in the disclosure may have the same meanings as generally understood by those skilled in the art.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

According to an embodiment, the processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

According to an embodiment, the auxiliary processor 123 may control at least some of the functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An AI model may be generated by machine learning. Such learning may be performed, for example, by the electronic device 101 in which an artificial intelligence is executed, or via a separate server (e.g., the server 108). A learning algorithm may include, but is not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

According to an embodiment, the memory 130 may store various data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

According to an embodiment, the program 140 may be stored as software in the memory 130, and may include, for example, an operating system (OS) 142, middleware 144, or an application 146. The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

According to an embodiment, the sound output module 155 may output a sound signal to the outside the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker. The display module 160 may visually provide information to the outside (e.g., a user) of the electronic device 101. The display module 160 may include, for example, a display, a hologram device, or a projector and control circuitry to control a corresponding one of the display, the hologram device, or the projector. According to an embodiment, the display module 160 may include a touch sensor adapted to sense a touch, or a pressure sensor adapted to measure an intensity of a force incurred by the touch.

According to an embodiment, the audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101. The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

According to an embodiment, the interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

According to an embodiment, the connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

According to an embodiment, the haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

According to an embodiment, the camera module 180 may capture a still image and moving images. According to an embodiment, the camera module 180 may include one or more lenses, image sensors, ISPs, or flashes.

According to an embodiment, the power management module 188 may manage power supplied to the electronic device 101. According to an embodiment, the power management module 188 may be implemented as, for example, at least a portion of a power management integrated circuit (PMIC).

According to an embodiment, the battery 189 may supply power to at least one component of the electronic device 101. According to an embodiment, the battery 189 may include, for example, a primary cell which is not rechargeable, a secondary cell which is rechargeable, or a fuel cell.

According to an embodiment, the communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. According to an embodiment, the communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

According to an embodiment, the wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beam-forming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

According to an embodiment, the antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)).

According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a portion of the antenna module 197.

According to an embodiment, the antenna module 297 may form a mmWave antenna module. According to an embodiment, the mmWave antenna module may include a PCB, an RFIC disposed on a first surface (e.g., the bottom surface) of the PCB or adjacent to the first surface and capable of supporting a designated high-frequency band (e.g., the mm Wave band), and a plurality of antennas (e.g., array antennas) disposed on a second surface (e.g., the top or a side surface) of the PCB, or adjacent to the second surface and capable of transmitting or receiving signals in the designated high-frequency band. At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
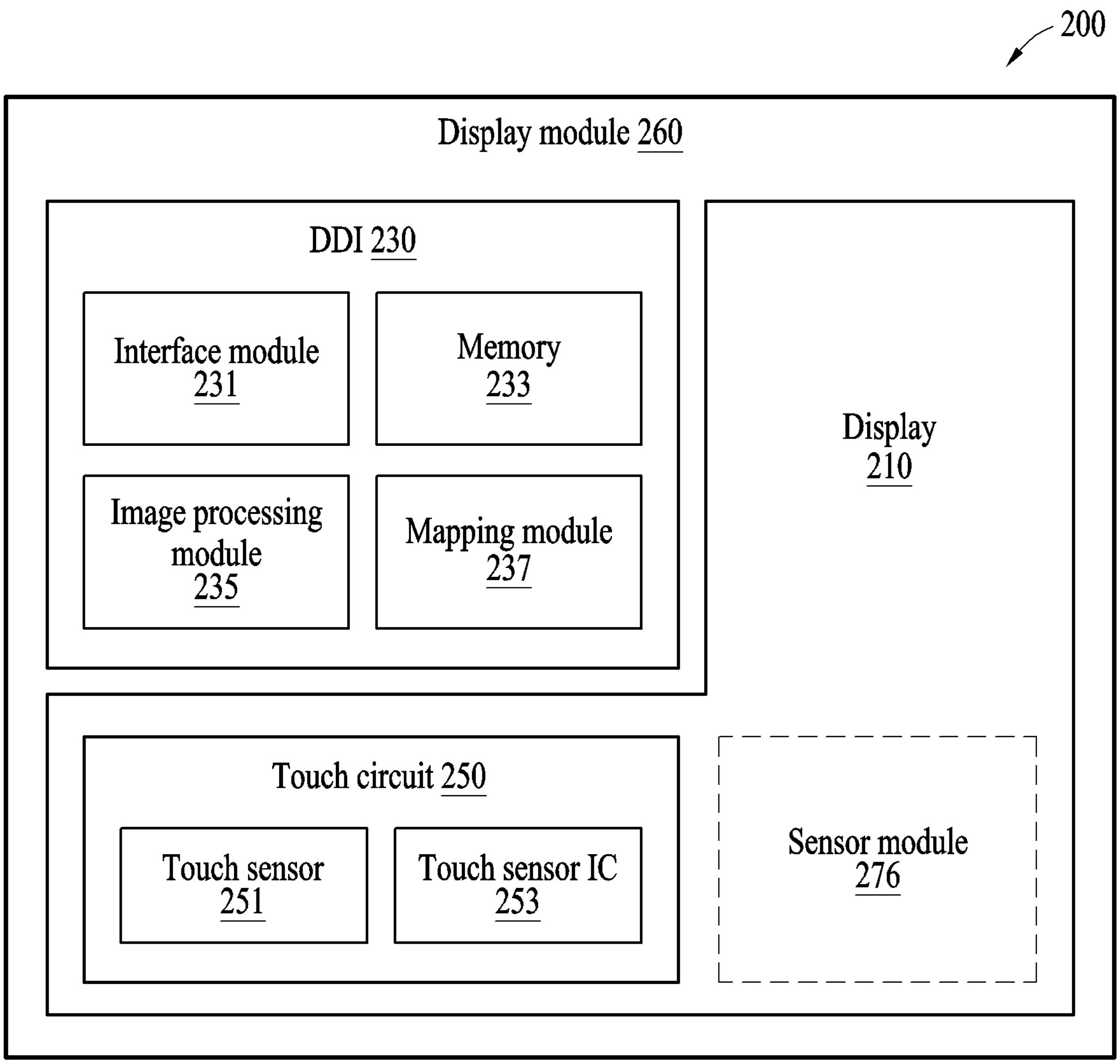
FIG. 2 is a block diagram of a display module according to one or more embodiments.

FIG. 2 is a block diagram 200 of a display module 260 according to one or more embodiments. Referring to FIG. 2, the display module 260 (e.g., the display module 160 of FIG. 1) may include a display 210, and a display driver integrated circuit (IC) (DDI) 230 for controlling the display 210. The DDI 230 may include an interface module 231, a memory 233 (e.g., a buffer memory), an image processing module 235, or a mapping module 237. The DDI 230 may receive, for example, image data or image information including an image control signal corresponding to a command to control the image data from another component of an electronic device via the interface module 231.

According to an embodiment, the image information may be received from a processor (e.g., a main processor, for example, an application processor) or an auxiliary processor (e.g., a GPU) operating independently of the functions of the main processor. The DDI 230 may communicate with a touch circuit 250 or a sensor module 276 via the interface module 231. In addition, the DDI 230 may store at least a portion of the received image information in the memory 233, for example, in the unit of frames.

According to an embodiment, the image processing module 235 may perform preprocessing or post-processing (e.g., adjustment of a resolution, brightness, or size) on at least a portion of the image data based on characteristics of the image data or characteristics of the display 210. According to an embodiment, the mapping module 237 may generate a voltage value or a current value corresponding to the image data that is preprocessed or post-processed through the image processing module 235. According to an embodiment, a voltage value or a current value may be generated, for example, based on at least some of attributes of pixels of the display 210 (e.g., arrangement of pixels (red, green, and blue (RGB) stripe or pentile structure) or a size of each of sub-pixels). At least some of the pixels of the display 210 may be driven based on, for example, at least a portion of the voltage value or the current value to display visual information (e.g., a text, image, or icon) corresponding to the image data through the display 210.

According to an embodiment, the display module 260 may further include the touch circuit 250. The touch circuit 250 may include a touch sensor 251 and a touch sensor IC 253 to control the touch sensor 251. The touch sensor IC 253 may, for example, control the touch sensor 251 to detect a touch input or a hovering input at a specific position on the display 210. For example, the touch sensor IC 253 may detect a touch input or a hovering input by measuring a change of a signal (e.g., a voltage, light intensity, resistance, or charge amount) at a specific position on the display 210. The touch sensor IC 253 may provide the processor with information (e.g., a position, area, pressure, or time) regarding the detected touch input or hovering input. According to an embodiment, at least a portion (e.g., the touch sensor IC 253) of the touch circuit 250 may be included as a portion of the DDI 230 or the display 210, or may be included as a portion of another component (e.g., an auxiliary processor 223) disposed outside of the display module 260.

According to an embodiment, the display module 260 may further include at least one sensor (e.g., a fingerprint sensor, an iris sensor, a pressure sensor, or an illuminance sensor) of the sensor module 276, or a control circuit for the at least one sensor. In this case, the at least one sensor or the control circuit for the at least one sensor may be embedded in a portion of the display module 260 (e.g., the display 210 or the DDI 230) or a portion of the touch circuit 250. For example, when the sensor module 276 embedded in the display module 260 includes a biometric sensor (e.g., a fingerprint sensor), the biometric sensor may obtain biometric information (e.g., a fingerprint image) related to a touch input through a partial area of the display 210. In another example, when the sensor module 276 embedded in the display module 260 includes a pressure sensor, the pressure sensor may obtain pressure information related to a touch input through a partial area or the entire area of the display 210. According to an embodiment, the touch sensor 251 or the sensor module 276 may be disposed between pixels of a pixel layer of the display 210 or above or below the pixel layer.

Figure 3A:
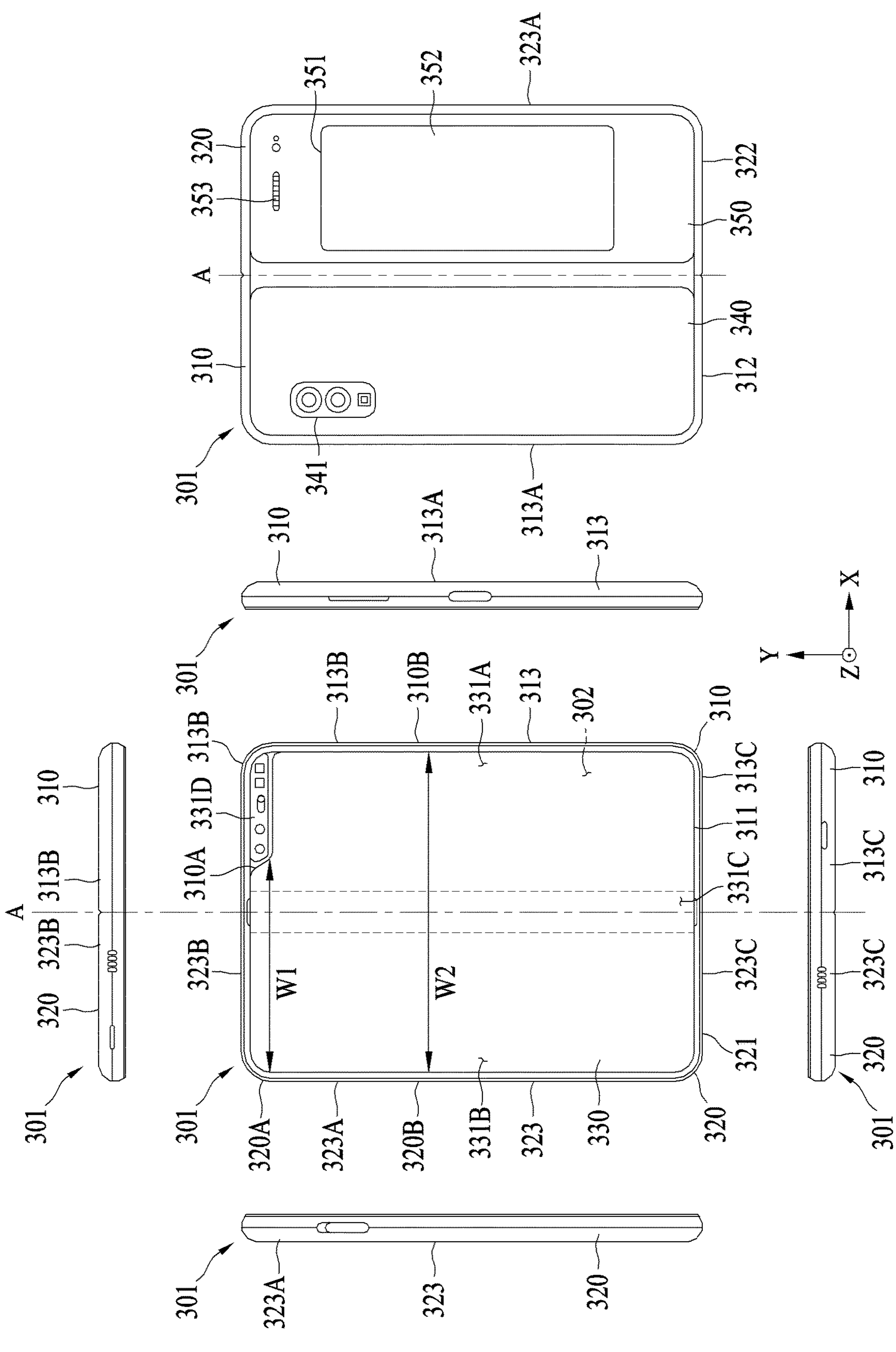
FIG. 3A is a view of an unfolded state of an electronic device according to one or more embodiments.

FIG. 3A is a view of an unfolded state of an electronic device 301 according to one or more embodiments.

Referring to FIG. 3A, the electronic device 301 may include a pair of housing structures 310 and 320 (e.g., foldable housing structures) rotatably coupled to each other through a hinge structure to be folded with respect to each other, a hinge cover for covering foldable portions of the pair of housing structures 310 and 320, and a display 330 (e.g., a flexible display, a foldable display, or a first display) disposed in a space formed by the pair of housing structures 310 and 320. In the present disclosure, a surface on which the display 330 is disposed may be defined as a front surface of the electronic device 301, and a surface opposite to the front surface may be defined as a rear surface of the electronic device 301. In addition, a surface surrounding a space between the front surface and the rear surface may be defined as a side surface of the electronic device 301. In some embodiments, the pair of housing structures 310 and 320 may include a first housing structure 310, a second housing structure 320, a first rear cover 340, and a second rear cover 350.

Figure 3B:
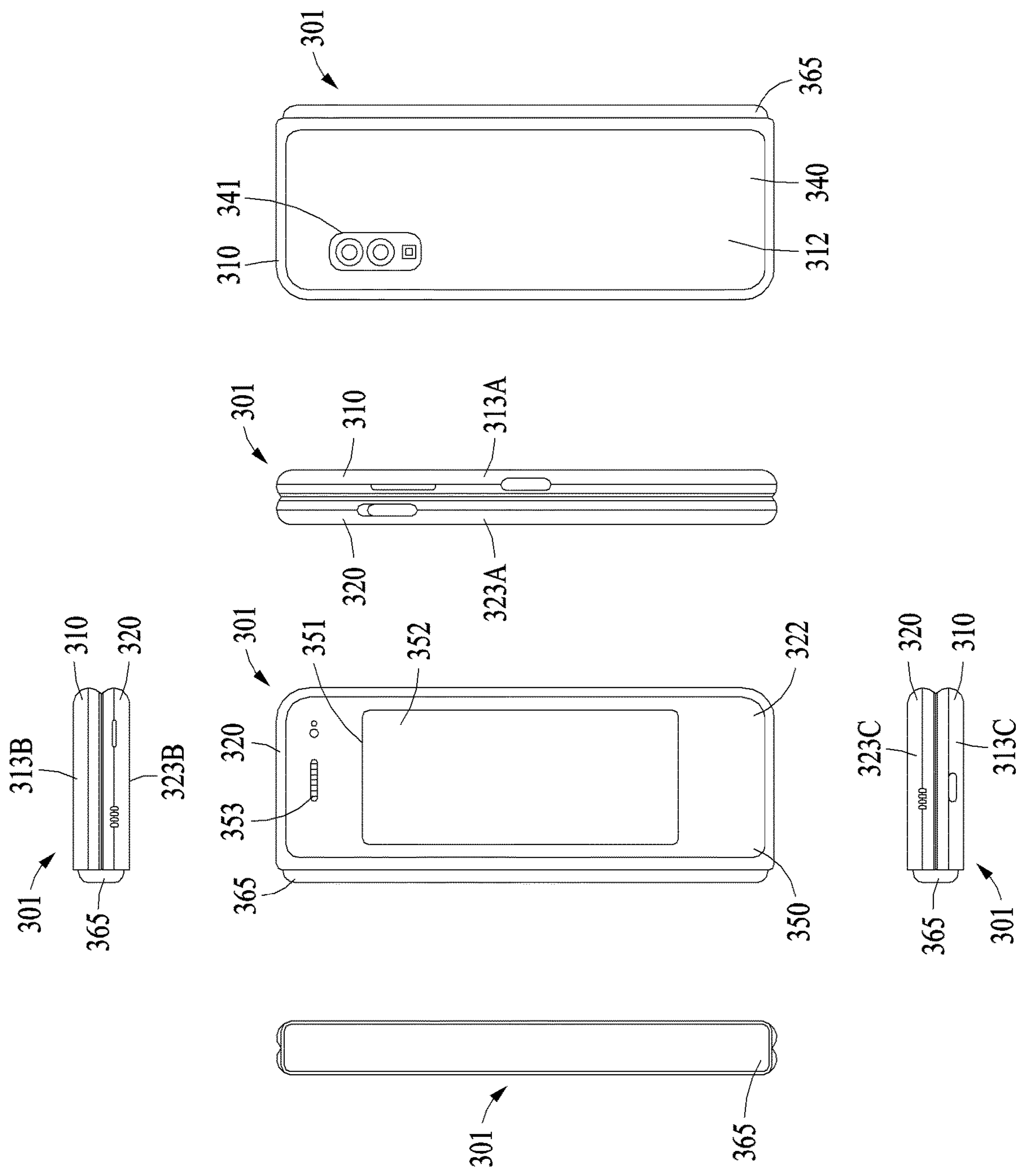
FIG. 3B is a view of a folded state of an electronic device according to one or more embodiments.

According to one or more embodiments, the pair of housing structures 310 and 320 of the electronic device 301 is not limited to the shape and combination shown in FIG. 3B, and may be implemented in a different shape or a different combination and/or coupling of components. For example, in an embodiment, the first housing structure 310 and the first rear cover 340 may be integrally formed, and the second housing structure 320 and the second rear cover 350 may be integrally formed.

According to one or more embodiments, the first housing structure 310 and the second housing structure 320 may be disposed on both sides with respect to a folding axis (an axis A) and may be symmetrical with respect to the folding axis (the axis A). In one or more embodiments, an angle or distance between the first housing structure 310 and the second housing structure 320 may vary according to whether the state of the electronic device 301 is the unfolded state (a flat state), the folded state, or an intermediate state. In one or more embodiments, unlike the second housing structure 320, the first housing structure 310 may additionally include a sensor area 331D in which various sensors are arranged. However, the first housing structure 310 and the second housing structure 320 may be mutually symmetrical in areas other than the sensor area 331D. In an embodiment, the sensor area 331D may be additionally disposed in or replaced with at least a partial area of the second housing structure 320. The sensor area 231 may include, for example, a camera hole area, a sensor hole area, an under-display camera (UDC) area, and/or an under-display sensor (UDS) area.

According to one or more embodiments, in the unfolded state of the electronic device 301, the first housing structure 310 may be connected to the hinge structure and may include a first surface 311 disposed to face the front surface of the electronic device 301, a second surface 312 facing a direction opposite to the first surface 311, and a first side member 313 enclosing at least a portion of a space between the first surface 311 and the second surface 312.

According to one or more embodiments, the first side member 313 may include a first side surface 313A disposed in parallel with the folding axis (the axis A), a second side surface 313B extending in a direction perpendicular to the folding axis from one end of the first side surface 313A, and a third side surface 313C extending in the direction perpendicular to the folding axis (the axis A) from the other end of the first side surface 313A.

According to one or more embodiments, in the unfolded state of the electronic device 301, the second housing structure 320 may be connected to the hinge structure and may include a third surface 321 disposed to face the front surface of the electronic device 301, a fourth surface 322 facing a direction opposite to the third surface 321, and a second side member 323 enclosing at least a portion of a space between the third surface 321 and the fourth surface 322.

According to one or more embodiments, the second side member 323 may include a fourth side surface 323A disposed in parallel with the folding axis (the axis A), a fifth side surface 323B extending in a direction perpendicular to the folding axis (the axis A) from one end of the fourth side surface 323A, and a sixth side surface 323C extending in the direction perpendicular to the folding axis (the axis A) from the other end of the fourth side surface 323A. In one or more embodiments, the third surface 321 may face the first surface 311 in the folded state.

According to one or more embodiments, the electronic device 301 may include a recess 302 formed to accommodate the display 330 through structural shape coupling of the first housing structure 310 and the second housing structure 320. The recess 302 may have substantially the same size as the display 330. In one or more embodiments, at least a portion of the first housing structure 310 and the second housing structure 320 may be formed of a metal material or a non-metal material having a selected magnitude of rigidity to support the display 330. In some embodiments, the first rear cover 340 may be disposed on the second surface 312 of the first housing structure 310, and may have a substantially rectangular periphery. In some embodiments, the periphery of the first rear cover 340 may be at least partially enclosed by the first housing structure 310. Similarly, the second rear cover 350 may be disposed on the fourth surface 322 of the second housing structure 320, and a periphery of the second rear cover 350 may be at least partially enclosed by the second housing structure 320. In the embodiment of FIG. 3A, the first rear cover 340 and the second rear cover 350 may be substantially symmetrical with respect to the folding axis (the axis A). In some embodiments, the first rear cover 340 and the second rear cover 350 may include various different shapes. In some embodiments, the first rear cover 340 and the first housing structure 310 may be integrally formed, and the second rear cover 350 and the second housing structure 320 may be integrally formed.

According to one or more embodiments, the first rear cover 340, the second rear cover 350, the first housing structure 310, and the second housing structure 320 may provide a space in which various components (e.g., a PCB, an antenna module, a sensor module, or a battery) of the electronic device 301 may be arranged through a structure in which the first rear cover 340, the second rear cover 350, the first housing structure 310, and the second housing structure 320 are coupled to one another. In some embodiments, one or more components may be disposed or visually exposed on the rear surface of the electronic device 301. For example, one or more components or sensors may be visually exposed through a first rear area 341 of the first rear cover 340. In one or more embodiments, the sensors may include a proximity sensor, a rear camera device, and/or a flash. In some embodiments, at least a portion of a sub-display 352 (e.g., a second display) may be visually exposed through a second rear area 351 of the second rear cover 350. In some embodiments, the electronic device 301 may include a speaker module 353 disposed through at least a partial area of the second rear cover 350.

According to one or more embodiments, the display 330 may be disposed in a space formed by the pair of housing structures 310 and 320. For example, the display 330 may be arranged to occupy substantially most of the front surface of the electronic device 301. Accordingly, the front surface of the electronic device 301 may include the display 330, and a partial area (e.g., a periphery area) of the first housing structure 310 and a partial area (e.g., a periphery area) of the second housing structure 320, which are adjacent to the display 330. In some embodiments, the rear surface of the electronic device 301 may include the first rear cover 340, a partial area (e.g., a periphery area) of the first housing structure 310 adjacent to the first rear cover 340, the second rear cover 350, and a partial area (e.g., a periphery area) of the second housing structure 320 adjacent to the second rear cover 350.

According to one or more embodiments, the display 330 may refer to a display having at least a partial area that is deformable into a flat surface or a curved surface. In some embodiments, the display 330 may include a folding area 331C, a first area 331A disposed on one side of the folding area 331C (e.g., a right area of the folding area 331C), and a second area 331B disposed on the other side of the folding area 331C (e.g., a left area of the folding area 331C). For example, the first area 331A may be disposed on the first surface 311 of the first housing structure 310, and the second area 331B may be disposed on the third surface 321 of the second housing structure 320. The area division of the display 330 is merely an example, and the display 330 may be divided into a plurality of areas (e.g., four or more areas, or two areas) depending on the structure or functions thereof. In an example, as shown in FIG. 3A, the display 330 may be divided into areas based on the folding axis (the axis A) or the folding area 331C extending in parallel to a y-axis. In some embodiments, the display 330 may be divided into areas based on another folding area (e.g., a folding area parallel to an x-axis) or another folding axis (e.g., a folding axis parallel to the x-axis). The area division of the display described above is merely physical division based on the pair of housing structures 310 and 320 and the hinge structure, and the display 330 may display substantially one full screen through the pair of housing structures 310 and 320 and the hinge structure. In some embodiments, the first area 331A and the second area 331B may have generally symmetrical shapes with respect to the folding area 331C. However, unlike the second area 331B, the first area 331A may include a notch cut area according to the presence of the sensor area 331D, but may be symmetrical to the second area 331B in the other areas. In some embodiments, the first area 331A and the second area 331B may include mutually symmetrical portions and mutually asymmetrical portions.

FIG. 3B is a view of a folded state of the electronic device 301 according to one or more embodiments.

Referring to FIG. 3B, a hinge cover 365 may be disposed between the first housing structure 310 and the second housing structure 320 to cover internal components. In some embodiments, the hinge cover 365 may be covered by a portion of the first housing structure 310 and the second housing structure 320 or may be exposed to the outside depending on an operating state (e.g., an unfolded or flat state or a folded state) of the electronic device 301. According to some embodiments, when the electronic device 301 is in the unfolded state as shown in FIG. 3A, the hinge cover 365 may not be exposed based on being covered by the first housing structure 310 and the second housing structure 320. According to some embodiments, when the electronic device 300 is in the folded state (e.g., a completely folded state) as shown in FIG. 3B, the hinge cover 365 may be exposed to the outside between the first housing structure 310 and the second housing structure 320. In some embodiments, when the first housing structure 310 and the second housing structure 320 are in the intermediate state where the first housing structure 310 and the second housing structure 320 are folded with a predetermined angle, the hinge cover 365 may be at least partially exposed to the outside of the electronic device 301 between the first housing structure 310 and the second housing structure 320. The area exposed in this case may be smaller than that in the fully folded state. In some embodiments, the hinge cover 365 may include a curved surface. In one or more embodiments, the hinge structure may be formed longitudinally or transversely when the electronic device 301 is viewed from the top. In one or more embodiments, the hinge structure may be plural. For example, all of the plurality of hinge structures may be arranged in the same direction. In another example, some of the plurality of hinge structures may be arranged and folded in different directions.

In one or more embodiments, operations of the first housing structure 310 and the second housing structure 320 and respective areas of the display 330 depending on the operating state (e.g., the unfolded or flat state and the folded state) of the electronic device 301 will be described. According to some embodiments, when the electronic device 301 is in the unfolded or flat state (e.g., the state of FIG. 3A), the first housing structure 310 and the second housing structure 320 may form an angle of 180 degrees therebetween, and the first area 331A and the second area 331B of the display may be disposed to face the same direction. In addition, the folding area 331C may form substantially the same plane as the first area 331A and the second area 331B. In some embodiments, when the electronic device 301 is in the unfolded state, the first housing structure 310 and the second housing structure 320 may be folded opposite such that the second surface 312 and the fourth surface 322 face each other. Accordingly, the first area 331A and the second area 331B of the display may be disposed to face opposite directions to each other.

In one or more embodiments, when the electronic device 301 is in the folded state (e.g., the state of FIG. 3B), the first housing structure 310 and the second housing structure 320 may be disposed to face each other. The first area 331A and the second area 331B of the display 330 may form a narrow angle (e.g., about 0 to 10 degrees) therebetween and may face each other. At least a portion of the folding area 331C may be formed as a curved surface having a predetermined curvature.

In one or more embodiments, when the electronic device 301 is in the intermediate state, the first housing structure 310 and the second housing structure 320 may be arranged to form a predetermined angle therebetween. The first area 331A and the second area 331B of the display 330 may form an angle greater than that in the folded state and smaller than that in the unfolded state. At least a portion of the folding area 331C may include a curved surface having a predetermined curvature, and the curvature may be less than that in the folded state.

Figure 4:
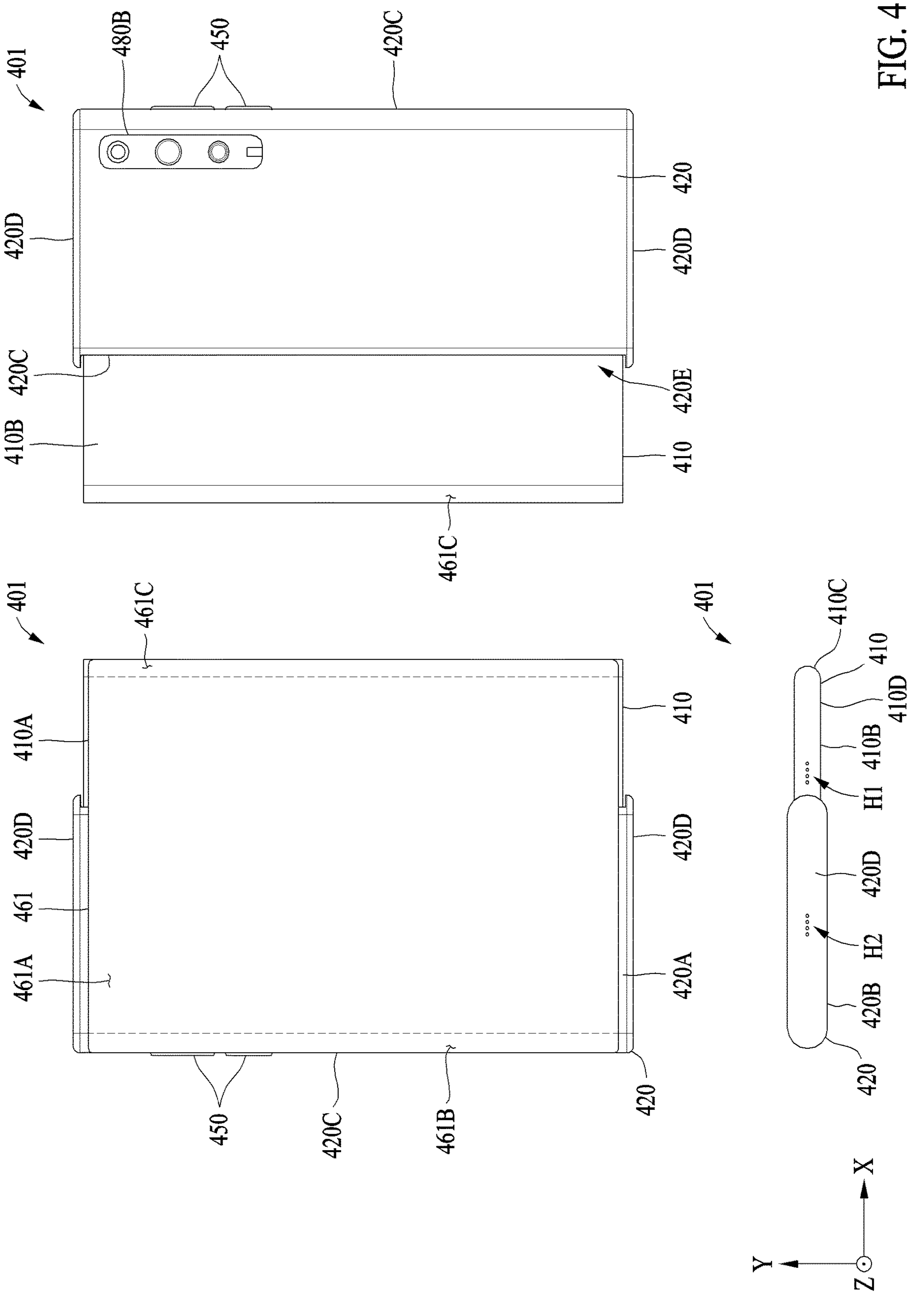
FIG. 4 is a view of an electronic device according to one or more embodiments.

FIG. 4 is a view of an electronic device 401 according to various embodiments.

According to one or more embodiments, the electronic device 401 (e.g., the electronic device 101 of FIG. 1) may include a first housing 410 and a second housing 420 that are movably coupled to each other. In some embodiments, the first housing 410 may be coupled to the second housing 420 to slide to the second housing 420. The first housing 410 may be configured to move relative to the second housing 420 in a first movement direction (e.g., a +X direction) or to move relative to the second housing 420 in a second movement direction (e.g., a −X direction) opposite the first movement direction. One or more embodiments of the present disclosure describe that the first housing 410 may move relative to the second housing 420, but are not limited thereto, and it may also be construed that the second housing 420 slides relative to the first housing 410.

According to one or more embodiments, the first housing 410 may include a first surface 410A (e.g., a first front surface), a second surface 410B (e.g., a first rear surface) opposite the first surface 410A, a plurality of (e.g., two) first side surfaces 410C (e.g., a first left side surface and a first right side surface) oriented in a first direction (e.g., a +/−X direction) and positioned between the first surface 410A and the second surface 410B, and a plurality of (e.g., two) second side surfaces 410D (e.g., a first upper side surface and a first lower side surface) oriented in a second direction (e.g., a +/−Y direction) intersecting with the first direction and positioned between the first surface 410A and the second surface 410B. In some embodiments, the plurality of first side surfaces 410C may be formed of rounded surfaces. In some embodiments, the first housing 410 may include at least one first hole H1 formed on a second side surface 410D (e.g., the first lower side surface) oriented in one direction (e.g., the −Y direction), of the second side surfaces 410D.

According to one or more embodiments, the second housing 420 may include a third surface 420A (e.g., a second front surface), a fourth surface 420B (e.g., a second rear surface) opposite the third surface 420A, a plurality of (e.g., two) third side surfaces 420C (e.g., a second left side surface and a second right side surface) oriented in the first direction (e.g., the +/−X direction) and positioned between the third surface 420A and the fourth surface 420B, and a plurality of (e.g., two) fourth side surfaces 420D (e.g., a second upper side surface and a second lower side surface) oriented in the second direction (e.g., the +/−Y direction) intersecting with the first direction and positioned between the third surface 420A and the fourth surface 420B. Of the plurality of third side surfaces 420C, a third side surface 420C oriented in one direction (e.g., the +X direction) may include an open portion 420E that is at least partially open. In some embodiments, the plurality of third side surfaces 420C may be formed of rounded surfaces. In some embodiments, the second housing 420 may include at least one second hole H2 formed on the fourth side surface 420D (e.g., the second lower side surface) oriented in one direction (e.g., the −Y direction) among the plurality of fourth side surfaces 420D. The second hole H2 may be aligned, for example, with the first hole H1.

According to one or more embodiments, the electronic device 401 may include a display 461 (e.g., a flexible display or a rollable display) including a screen display area (461A, 461B, and 461C). In some embodiments, the screen display area (461A, 461B, and 461C) may include a first area 461A positioned on the first surface 410A and the third surface 420A, a second area 461B positioned on a third side surface 420C oriented in one direction (e.g., the −X direction) of the third side surfaces 420C, and a third area 461C positioned on a third side surface 420C oriented in the other direction (e.g., the +X direction) of the third side surfaces 420C and surrounding at least partially the open portion 420E.

In one or more embodiments, the second area 461B and the third area 461C of the display 461 may have flexibly curved round surfaces. In some embodiments, the second area 461B may be partially on the first surface 410A and the third surface 420A. In some embodiments, the third area 461C may be partially on the first surface 410A and the third surface 420A. In some embodiments, the third area 461C may be partially on the second surface 410B and the fourth surface 420B.

In one or more embodiments, the display 461 may be configured to partially display a screen. For example, the display 461 may display the screen through the first area 461A positioned on the first surface 410A and the third surface 420A, and the second area 461B, the third area 461C, and/or the fourth area 461D may display the screen from points of view different from that of the first area 461A.

According to one or more embodiments, the electronic device 401 may change in shape between a first shape (e.g., a closed shape, the shape of FIG. 2A) having the screen display area (e.g., the first area 461A, the second area 461B, and the third area 461C) of a first size and a second shape (e.g., an open shape, the shape of FIG. 2B) having the screen display area (e.g., the first area 461A, the second area 461B, and the third area 461C) larger than the first size, when viewed in one direction (e.g., the −Z direction). For example, when the first housing 410 moves relative to the second housing 420 in the first movement direction (e.g., the +X direction) in the first shape, the screen display area of the electronic device 401 viewed in one direction (e.g., the −Z direction) may expand as the size of the first area 461A increases and the size of the fourth area 461D decreases. In one example, when the first housing 410 moves relative to the second housing 420 in the second movement direction (e.g., the −X direction) opposite to the first movement direction in the second shape, the size of the first area 461A may decrease and the size of the fourth area 461D may increase. While the electronic device 401 changes in shape between the first shape and the second shape, the size of the second area 461B and the size of the third area 461C may be substantially constant.

According to one or more embodiments, the electronic device 401 may include an input module 450 (e.g., the input module 150 of FIG. 1). The input module 450 may be formed, for example, on a third side surface 420C (e.g., the second left side surface) where the open portion 420E is not formed, of the plurality of third side surfaces 420C.

According to one or more embodiments, the electronic device 401 may include a camera module 480B (e.g., the camera module 180 of FIG. 1). The electronic device 401 may further include additional camera modules, in addition to the shown camera module.

Figure 5:
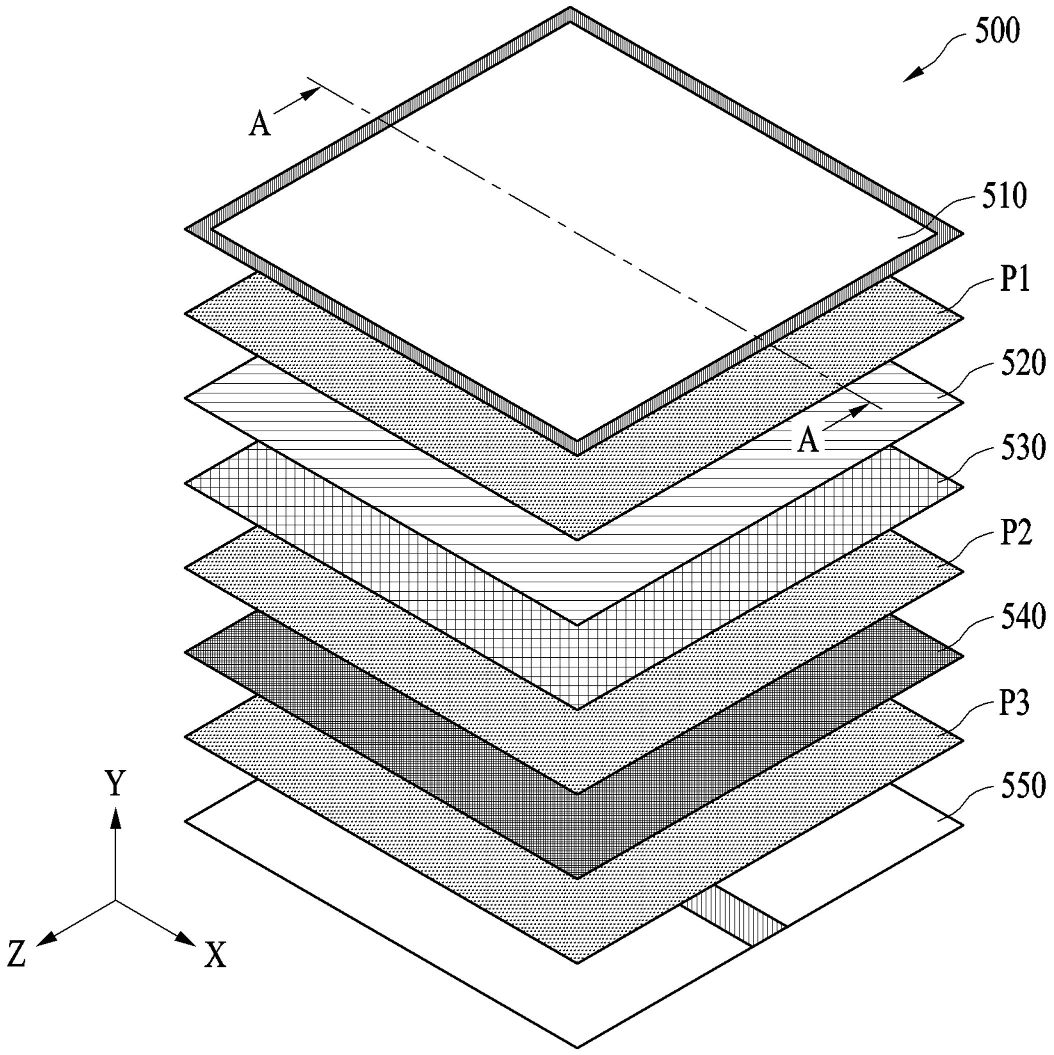
FIG. 5 is an exploded perspective view of a laminated structure of a display according to one or more embodiments.

FIG. 5 is an exploded perspective view of a laminated structure of a display 500 according to one or more embodiments. The display 500 may be a flexible display, a foldable display, or a rollable display.

Referring to FIG. 5, according to one or more embodiments, the display 500 (e.g., the display module 160 of FIG. 1, the display 330 of FIGS. 3A and 3B, or the display 461 of FIG. 4) may include a window 510 (e.g., a polyimide (PI) film, ultra-thin glass (UTG), foldable thin glass (FTG), a glass substrate, polyethylene terephthalate (PET), colorless PI (CPI), or thermoplastic polyurethane (TPU)), and a polarizer (POL) 520 (e.g., a polarizing film), a display panel 530, a polymer member 540, and a conductive plate 550 which may be sequentially disposed on a rear surface of the window 510. According to one or more embodiments, the window 510, the POL 520, the display panel 530, the polymer member 540, and the conductive plate 550 may be disposed to cross at least a portion of a first surface (e.g., the first surface 311 of FIG. 1) of a first housing structure (e.g., the first housing structure 310 of FIGS. 3A and 3B) and a third surface (e.g., the third surface 321 of FIGS. 3A and 3B) of a second housing structure (e.g., the second housing structure 320 of FIGS. 3A and 3B).

According to one or more embodiments, the POL 520, the display panel 530, the polymer member 540, and the conductive plate 550 may be attached to each other with adhesive members P1, P2, and P3. The adhesive members P1, P2, and P3 may include at least one of an optical clear adhesive (OCA), a pressure sensitive adhesive (PSA), a heat-reactive adhesive, a general purpose adhesive, or a double-sided tape. In some embodiments, the display 500 may include another adhesive member P4 (e.g., a double-sided tape or a waterproofing member) arranged along an edge on one surface of the conductive plate 550. In some embodiments, the display 500 may be attached to a support member assembly of an electronic device (e.g., the electronic device 301 of FIGS. 3A and 3B or the electronic device 401 of FIG. 4) with the other adhesive member P4.

According to one or more embodiments, the polymer member 540 may be applied with a dark color (e.g., black) to help display a background when the display is turned off. In some embodiments, the polymer member 540 may act as a cushion for preventing the display 500 from being damaged by absorbing shock from the outside of the electronic device. In some embodiments, the conductive plate 550, in the form of a metal sheet, may contribute to the reinforcement of rigidity of the electronic device, and may be used to block ambient noise and dissipate heat emitted from surrounding heat emitting components.

According to one or more embodiments, the conductive plate 550 may include at least one of Cu, Al, steel use stainless (SUS), or CLAD (e.g., a laminated member in which SUS and Al are alternately arranged). According to one or more embodiments, the conductive plate 550 may include other alloy materials.

According to one or more embodiments, the display 500 may include at least one functional member disposed between the polymer member 540 and the conductive plate 550. In some embodiments, the functional member may include a graphite sheet for heat dissipation, an added display, a force touch flexible PCB (FPCB), a fingerprint sensor FPCB, an antenna radiator for communication, a heat dissipation sheet, a conductive/non-conductive tape, or an open cell sponge. According to one or more embodiments, the display 500 may further include a detection member for detecting an input by an electromagnetic induction type writing member. According to one or more embodiments, the detection member may include a digitizer.

According to one or more embodiments, an electronic device (e.g., the electronic device 101 of FIG. 1, the electronic device 301 of FIGS. 3A and 3B, or the electronic device 401 of FIG. 4) may include a protective film structure.

According to one or more embodiments, the protective film structure may be disposed on a surface, inside, or both of an electronic device (e.g., the electronic device 101 of FIG. 1, the electronic device 301 of FIGS. 3A and 3B, or the electronic device 401 of FIG. 4).

According to one or more embodiments, the protective film structure may be disposed on a surface, inside, or both of a display (e.g., the display 210 of FIG. 2, the display 330 of FIGS. 3A and 3B, or the display 461 of FIG. 4).

According to one or more embodiments, the protective film structure may be disposed on at least one surface of a window (e.g., the window 510 of FIG. 5) of a display (e.g., the display 210 of FIG. 2, the display 330 of FIGS. 3A and 3B, or the display 461 of FIG. 4).

According to one or more embodiments, the protective film structure may include a hard coating layer, a transparent adhesive layer, a base layer disposed between the hard coating layer and the transparent adhesive layer, and a primer layer disposed between the transparent adhesive layer and the base layer, and the transparent adhesive layer may include polysilazane, silazane, or both.

According to one or more embodiments, the transparent adhesive layer of the protective film structure may have at least one of a thickness of about 50 nm to about 30 μm, adhesion strength of about 750 N/m or more, or light transmittance of about 80% or more. In some embodiments, the transparent adhesive layer of the protective film structure may have a thickness of about 50 nm to about 30 μm and light transmittance of about 80% or more. In some embodiments, the transparent adhesive layer of the protective film structure may have adhesion strength of about 750 N/m or more and light transmittance of about 80% or more. In some embodiments, the transparent adhesive layer of the protective film structure may have a thickness of about 50 nm to about 30 μm and adhesion strength of about 750 N/m or more.

According to one or more embodiments, the transparent adhesive layer of the protective film structure may further include siloxane, and a molecular weight of polysilazane may be about 1,500 g/mol or more.

According to one or more embodiments, at least a portion of the transparent adhesive layer of the protective film structure may have a lattice pattern, and a line thickness of the lattice pattern may be about 100 nm to about 10 μm.

According to one or more embodiments, the lattice pattern of the protective film structure may include at least one of a straight pattern, a diagonal pattern, and a geometric mesh pattern.

According to one or more embodiments, a thickness of the primer layer of the protective film structure may be about 0.1 μm to about 5 μm.

According to one or more embodiments, the primer layer of the protective film structure may include the same coating material as the hard coating layer (e.g., the primer layer and the hard coating layer may each include a first coating material).

According to one or more embodiments, the hard coating layer of the protective film structure may have at least one of a thickness of about 5 μm to about 70 μm, pencil hardness of about 7 H or more, or flexural strength of about 2.0 R or more. In some embodiments, the hard coating layer of the protective film structure may have a thickness of about 5 μm to about 70 μm and pencil hardness of about 7 H or more. In some embodiments, the hard coating layer of the protective film structure may have at least one of a thickness of about 5 μm to about 70 μm or flexural strength of about 2.0 R or more. In some embodiments, the hard coating layer of the protective film structure may have pencil hardness of about 7 H or more and flexural strength of about 2.0 R or more.

According to one or more embodiments, the hard coating layer of the protective film structure may include a functional layer on a surface, inside, or both of the hard coating layer, and the functional layer may include an anti-fouling layer.

According to one or more embodiments, a protective film structure may include a hard coating layer, a transparent adhesive layer, and a base layer formed between the hard coating layer and the transparent adhesive layer, and the transparent adhesive layer may include nanoparticles and an adhesive.

According to one or more embodiments, the transparent adhesive layer of the protective film structure may have at least one of a thickness of about 50 nm to about 30 μm, adhesion strength of about 750 N/m or more, or light transmittance of about 80% or more. In some embodiments, the transparent adhesive layer of the protective film structure may have a thickness of about 50 nm to about 30 μm and light transmittance of about 80% or more. In some embodiments, the transparent adhesive layer of the protective film structure may have adhesion strength of about 750 N/m or more and light transmittance of about 80% or more. In some embodiments, the transparent adhesive layer of the protective film structure may have a thickness of about 50 nm to about 30 μm and adhesion strength of about 750 N/m or more.

According to one or more embodiments, at least a portion of the transparent adhesive layer of the protective film structure may have a lattice pattern, and the lattice pattern may have a line thickness of about 100 nm to about 10 μm.

According to one or more embodiments, the lattice pattern of the protective film structure may include at least one of a straight pattern, a diagonal pattern, and a geometric mesh pattern.

According to one or more embodiments, the nanoparticles of the protective film structure may include at least one selected from a group including silicon (Si), titanium (Ti), tantalum (Ta), zirconium (Zr), boron (B), aluminum (Al), magnesium (Mg), zinc (Zn), tin (Sn), cerium (Ce), vanadium (V), chromium (Cr), antimony (Sb), and oxides thereof.

According to one or more embodiments, the nanoparticles of the protective film structure may have a particle size of about 300 nm or less, and the nanoparticles may be included in an amount of about 1 part by weight to 10 parts by weight with respect to 100 parts by weight of the adhesive.

According to one or more embodiments, the hard coating layer of the protective film structure may have at least one of a thickness of about 5 μm to about 70 μm, pencil hardness of about 7 H or more, or flexural strength of about 2.0 R or more. In some embodiments, the hard coating layer of the protective film structure may have a thickness of about 5 μm to 70 μm and pencil hardness of about 7 H or more. In some embodiments, the hard coating layer of the protective film structure may have at least one of a thickness of about 5 μm to 70 μm or flexural strength of about 2.0 R or more. In some embodiments, the hard coating layer of the protective film structure may have pencil hardness of about 7 H or more and flexural strength of about 2.0 R or more.

According to one or more embodiments, the hard coating layer of the protective film structure may include a functional layer on a surface, inside, or both of the hard coating layer, and the functional layer may include an anti-fouling layer.

According to one or more embodiments, an electronic device (e.g., the electronic device 101 of FIG. 1, the electronic device 301 of FIGS. 3A and 3B, or the electronic device 401 of FIG. 4) including a flexible display, and a protective film structure disposed on the flexible display may be provided.

According to one or more embodiments, the protective film structure may be disposed on a window (e.g., the window 510 of FIG. 5) of the flexible display, and the flexible display may be a foldable or rollable display.

According to one or more embodiments, the protective film structure may include a transparent adhesive layer having a lattice pattern at a position corresponding to a folding area or a bending area of the display.

Figure 6A:
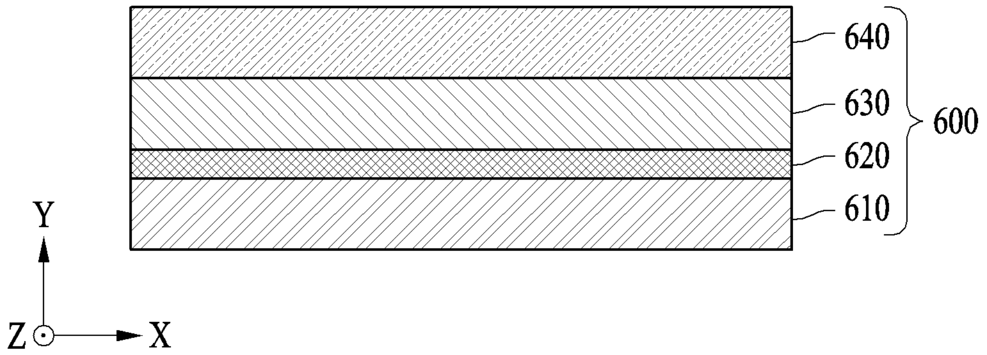
FIG. 6A is a cross-sectional view of a protective film structure according to one or more embodiments.
Figure 6B:
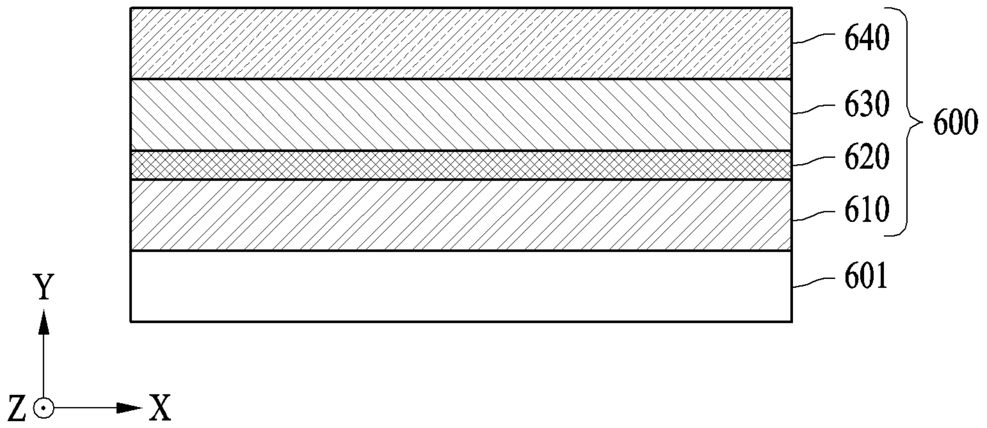
FIG. 6B is a cross-sectional view of a protective film structure which is attached to a window of a display according to one or more embodiments.

FIG. 6A shows a cross-sectional view of a protective film structure 600 according to one or more embodiments, and FIG. 6B shows a cross-sectional view of the protective film structure 600 attached to a window 601 of a display according to one or more embodiments.

Referring to FIGS. 6A and 6B, in the protective film structure 600, a transparent adhesive layer 610, a base layer 630, and a hard coating layer 640 may be laminated in order, and a primer layer 620 may be disposed between the transparent adhesive layer 610 and the base layer 630. The protective film structure 600 may be disposed on at least one surface of the window 601 (e.g., the window 510 of FIG. 5) of the display (e.g., the display 210 of FIG. 2, the display 330 of FIGS. 3A and 3B, or the display 461 of FIG. 4). Some configurations of the display may be omitted or briefly shown in FIG. 6B.

According to one or more embodiments, in FIG. 6B, the display (e.g., the display 210 of FIG. 2, the display 330 of FIGS. 3A and 3B, or the display 461 of FIG. 4) corresponds to a flexible display (e.g., a foldable or rollable display), and the transparent adhesive layer 610 of the protective film structure 600 may be in direct contact with and bonded to the window 601 (e.g., the window 510 of FIG. 5) of the flexible display.

According to one or more embodiments, the transparent adhesive layer 610 provides an adhesion function while realizing high transparency, high strength, and flexible performance, and the transparent adhesive layer 610 may have hardness of, for example, about 5 H or more, about 6 H or more, or about 8 H or more. The transparent adhesive layer 610 may have light transmittance of, for example, about 80% or more or about 90% or more.

According to one or more embodiments, the transparent adhesive layer 610 may have a thickness of, for example, about 50 nm to about 30 μm, about 50 nm to about 10 μm, about 50 nm to about 5 μm, about 50 nm to about 1 μm, or about 50 nm to about 300 nm. Accordingly, flexible performance, durability, and high strength may be realized, while preventing degradation of optical performance of the display (e.g., the display 210 of FIG. 2, the display 330 of FIGS. 3A and 3B, or the display 461 of FIG. 4) (e.g., the flexible display).

According to one or more embodiments, the transparent adhesive layer 610 may have an adhesion strength of, for example, about 750 N/m or more, about 850 N/m or more, or about 1,000 N/m or more (e.g., a test piece is manufactured based on ASTM D903 or ASTM D2095), and this may be used as a support to achieve high hardness of the hard coating layer.

According to one or more embodiments, the transparent adhesive layer 610 may include one or more of polysilazane, silazane, and siloxane. Accordingly, the influence on flexible performance and optical characteristics may be minimized, and the flexible performance and the optical characteristics of the display may be improved (e.g., the display 210 of FIG. 2, the display 330 of FIGS. 3A and 3B, or the display 461 of FIG. 4) (e.g., the flexible display) while maintaining the high hardness of the hard coating layer 640 in the protective film structure 600.

According to one or more embodiments, each of polysilazane and silazane may contain organic silazane (e.g., organic polysilazane (OPSZ)), inorganic silazane (e.g., inorganic polysilazane (PHPS)), or both. For example, polysilazane and silazane may be represented by Chemical Formulae 1 and 2 below.

[Chemical Formula 1]

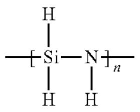

[Chemical Formula 2]

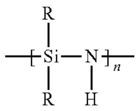

For example, Chemical Formula 1 represents inorganic silazane, Chemical Formula 2 represents organic silazane. In Chemical Formulae 1 and 2, R may be selected from hydrogen, alkyl having 1 to 30 carbon atoms, an alkenyl group having 2 to 30 carbon atoms, and an aryl group having 6 to 20 carbon atoms, and n may be an integer greater than or equal to 1, greater than or equal to 50, or greater than or equal to 100.

According to one or more embodiments, polysilazane may have a molecular weight (e.g., Mn or Mw) of, for example, about 1,500 g/mol or more, about 3,000 g/mol or more, about 6,000 g/mol or more, or about 1,500 g/mol to about 5,000 g/mol. This may improve the adhesive power between the window 601 and the base layer 630, improve the strength (e.g., adhesion strength or peeling strength) and the transparency of the transparent adhesive layer 610, and realize the flexible performance.

According to one or more embodiments, siloxane is a compound containing silicon, oxygen, and hydrogen among compounds having a —Si—O— bond, and may, for example, be represented by Chemical Formula 3 below. Siloxane may improve the adhesive power between the window 601 and the base layer 630, improve the strength (e.g., adhesion strength or peeling strength) and the transparency of the transparent adhesive layer 610, and realize the flexible performance.

[Chemical Formula 3]

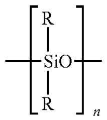

In Chemical Formula 3, R may be selected from hydrogen, alkyl having 1 to 30 carbon atoms, an alkenyl group having 2 to 30 carbon atoms, and an aryl group having 6 to 20 carbon atoms, and n may be an integer greater than or equal to 1, greater than or equal to 50, or greater than or equal to 100. For example, disiloxane and trisiloxane may be (—$H_2SiO$-)n (e.g., n is an integer greater than or equal to 2).

According to one or more embodiments, the primer layer 620 may be disposed between the transparent adhesive layer 610 and the base layer 630 to increase the adhesive power between the transparent adhesive layer 610 and the base layer 630. The primer layer 620 may, for example, include a polymer resin having the same coating material or silane structure as that of the hard coating layer 640 (e.g., a first coating material), a self-adhesive type transparent adhesive, or both. The polymer resin having a silane structure may, for example, include at least one of a silane primer, an acrylic silane primer, a silane glass primer, and an amino silane primer.

According to one or more embodiments, the transparent adhesive may include, for example, at least one of an OCA, an optical clear resin (OCR), a PSA, an epoxy-based adhesive, a silicone-based adhesive, an acrylic adhesive, and a urethane-based adhesive.

According to one or more embodiments, the primer layer 620 may have a thickness of, for example, about 0.1 μm to about 5 μm, and this may provide the adhesive power while minimizing or preventing the degradation of the transparency and the flexible performance.

According to one or more embodiments, the base layer 630 may be a base film with flexible performance which is disposed between the hard coating layer 640 and the transparent adhesive layer 610, and the base layer 630 may be a transparent film having durability. The transparent film may include, for example, glass, a polymer, or both. The polymer may include at least one of polyester, polyethylene, PET, polypropylene, polydimethylsiloxane (PDMS), poly-4-vinylphenol, polymethyl methacrylate, polyvinylidene fluoride, polystyrene, polycarbonate, PI, cellulose, polyvinyl chloride, polytetrafluoroethylene, polyvinyl alcohol, and TPU.

According to one or more embodiments, the base layer 630 may be used as a support suitable for the realization of the protective function of the hard coating layer 640 and the flexible performance, and may minimize or prevent damage on the optical characteristics of the display (e.g., the display 210 of FIG. 2, the display 330 of FIGS. 3A and 3B, or the display 461 of FIG. 4), and the base layer 630 may have a thickness of, for example, about 40 μm to about 70 μm, about 40 μm to about 60 μm, or about 45 μm to about 50 μm. The base layer 630 may have light transmittance (e.g., in a range of wavelengths of 400 nm to 800 nm) of, for example, about 80% or more or about 90% or more.

According to one or more embodiments, the hard coating layer 640 may provide the protective function of the display (e.g., the display 210 of FIG. 2, the display 330 of FIGS. 3A and 3B, or the display 461 of FIG. 4) from external factors and/or a user, and may be formed on the base layer 630. The hard coating layer 640 may realize the flexible performance while providing high hardness and high light transmittance of the hard coating layer 640 with the introduction of the transparent adhesive layer 610. The hard coating layer 640 may have a thickness of, for example, about 5 μm to about 70 μm, about 15 μm to about 70 μm, or about 20 μm to about 60 μm. The hard coating layer 640 may have pencil hardness of, for example, about 7 H or more or about 8 H or more, and this may realize high hardness with a thin thickness.

According to one or more embodiments, the hard coating layer 640 may have flexural strength of, for example, about 2.0 R or more (e.g., a test piece is manufactured and measurement is performed based on ASTM D790). The hard coating layer 640 may have a repulsive power of, for example, about 5.0 N or less, about 4.0 N or less, or about 3.0 N or less, and this may realize the flexible performance with high hardness.

According to one or more embodiments, the hard coating layer 640 may have light transmittance (e.g., in a range of wavelengths of 400 nm to 800 nm) of, for example, about 80% or more or about 90% or more. This may minimize or prevent damage on the optical characteristics of the display (e.g., the display 210 of FIG. 2, the display 330 of FIGS. 3A and 3B, or the display 461 of FIG. 4).

According to one or more embodiments, the hard coating layer 640 may include, for example, at least one of an organic material (e.g., a polyurethane-based resin, an acrylate-based resin, an urethane acrylate-based resin, a (meth) acrylate-based resin, a silicone acrylate-based resin, an epoxy acrylate-based resin, an epoxy-based resin, or a silicone-based resin), an inorganic material (e.g., oxide of $ZrO_2$, $SiO_2$, or $Al_2O_3$), nanocomposite (e.g., hydroxyapatite coated AF (HACAF) or HA-bentonite coated AF (HAB-CAF)), and a silicone-based organic and inorganic hybrid hard coating material, but embodiments are not limited thereto.

According to one or more embodiments, the hard coating layer 640 may further include a functional layer on a surface, inside, or both of the hard coating layer 640. The functional layer may, for example, include an anti-fouling layer including one or more of anti-fingerprint coating (water-repellent/oil-repellent), anti-scratch coating (hydrophilic/lipophilic), and invisible fingerprint (IF) coating, and the anti-fouling layer may provide, for example, fingerprint resistance performance.

According to one or more embodiments, the protective film structure 600 may form the hard coating layer 640 on one surface of the base layer 630, and may sequentially form and laminate the primer layer 620 and the transparent adhesive layer 610 on the other surface of the base layer 630. According to one or more embodiments, one or more of spin coating, spray coating, dip coating, flow coating, bar coating, die coating, slot coating, printing coating, a sol-gel method, and a lamination method may be used, but embodiments are not limited thereto. According to one or more embodiments, the strength, the hardness, and/or the adhesive power may be increased by adding heat curing and light curing (e.g., ultraviolet (UV) curing, a light intensity of about 10 $mJ/cm^2$ to about 1,000 $mJ/cm^2$ at a wavelength of 400 nm or less).

According to one or more embodiments, a protective film structure (e.g., the protective film structure 600 of FIG. 6) may be manufactured, and the hardness and the flexible performance of the hard coating layer 640 may be evaluated according to Table 1 below. For example, each of the repulsive power, module pen-drop, single bending, and pencil hardness may be measured based on standard test criteria (e.g., ASTM D790, ASTM D903, and ASTM D2095).

For example, for the module pen-drop, Fine Tech 5.8 g 0.3 Φ, a stone plate, or a SUS plate, or a tester of a pen drop jig (12 mm) are used. After attaching a PET film to a front surface/rear surface of UTG, the UTG is placed on the SUS plate, and evaluation may be performed and cracks may be confirmed in 1 cm increments.

For example, the flexural strength is measured simultaneously with the repulsive power, and a universal testing machine, an anti-scattering film (PE 80 μm), and a bending jig Z0000000-331487 are used. The anti-scattering film is attached to an outer surface of UTG/FTG, the UTG is mounted on a plate, the plate is fallen, a damage distance (a falling speed of 20 mm/min) may be measured.

For example, Table 1 shows the hard coating performance with high hardness at the level of tempered glass (pencil hardness of about 8 H) while maintaining improved flexible performance. In addition, in an evaluation of results of a pen-drop test, the improved durability may be confirmed.

For example, in the prepared protective film structure, a flexible substrate (e.g., FTG, about 30 μm), polysilazane (e.g., about 100 nm to about 200 nm), a primer layer (e.g., about 5 μm), a PET film (e.g., about 50 μm), and a hard coating (e.g., HACAF, about 40 μm) may be laminated in order.

TABLE 1

| | Flexible performance | | Surface |
|---|---|---|---|
| Repulsive power (@ 1.4 R) | Module pen-drop (Φ 0.3) | Single bending (R) (0.9 R or less) | characteristics Pencil hardness |
| 2.54 to 2.70N | 50 | 0.86 | 8 H |

Figure 7A:
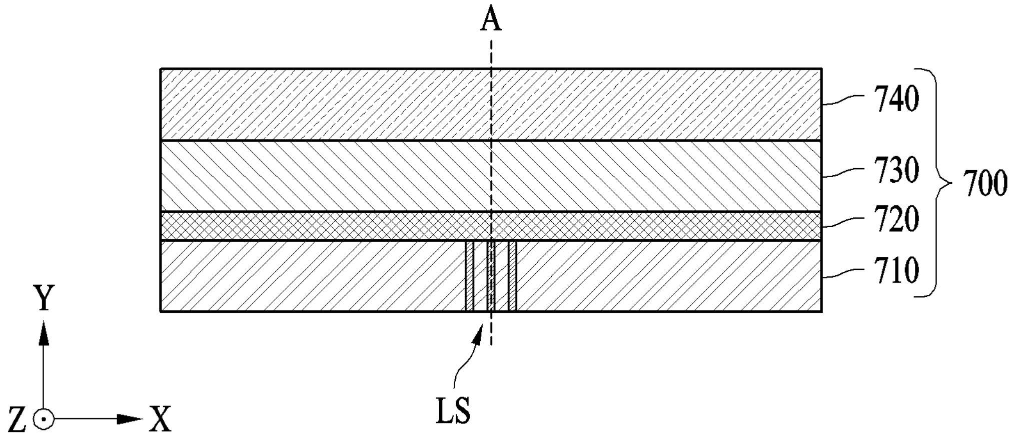
FIG. 7A is a cross-sectional view of a protective film structure according to one or more embodiments.
Figure 7B:
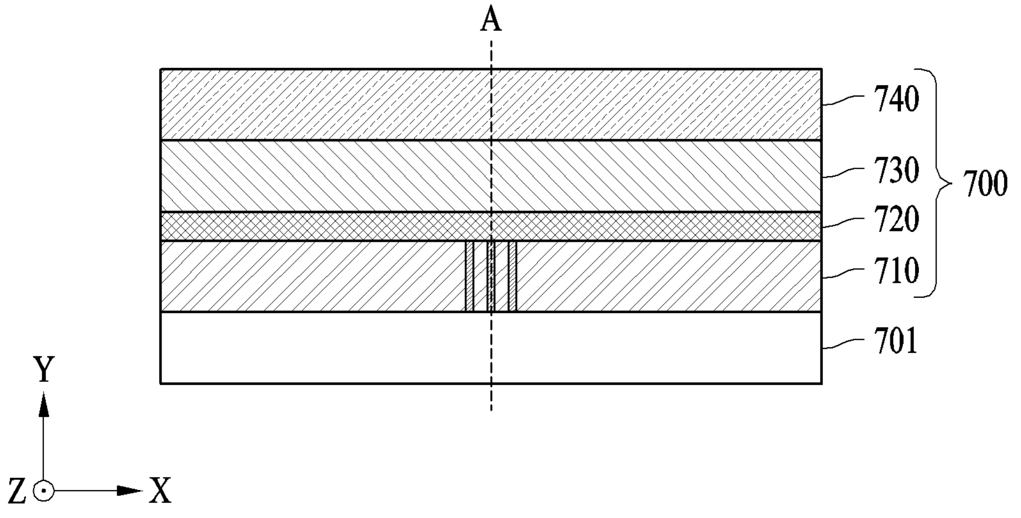
FIG. 7B is a cross-sectional view of a protective film structure according to one or more embodiments.
Figure 7C:
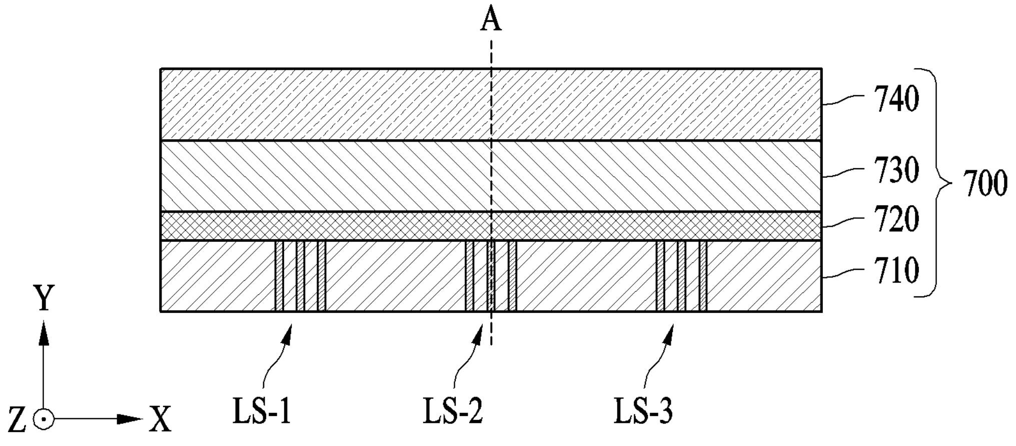
FIG. 7C is a cross-sectional view of a protective film structure which is attached to a window of a display according to one or more embodiments.
Figure 7D:
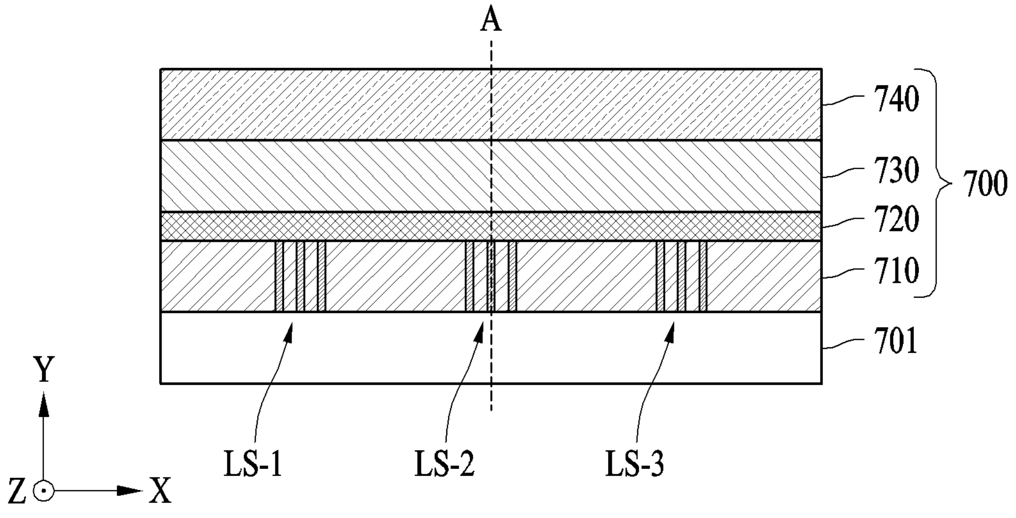
FIG. 7D is a cross-sectional view of a protective film structure which is attached to a window of a display according to one or more embodiments.

FIGS. 7A and 7B show cross-sectional views of a protective film structure 700 according to one or more embodiments, and FIGS. 7C and 7D show cross-sectional views of the protective film structure 700 attached to a window 701 of a display according to one or more embodiments.

Referring to FIGS. 7A, 7B, 7C, and 7D, in the protective film structure 700, a transparent adhesive layer 710, a base layer 730, and a hard coating layer 740 may be laminated in order, and a primer layer 720 may be disposed between the transparent adhesive layer 710 and the base layer 730. The protective film structure 700 may be disposed on at least one surface of the window 701 (e.g., the window 510 of FIG. 5) of the display (e.g., the display 210 of FIG. 2, the display 330 of FIGS. 3A and 3B, or the display 461 of FIG. 4). Some configurations of the display may be omitted or briefly shown in FIGS. 7C and 7D.

According to one or more embodiments, in FIGS. 7C and 7D, the display (e.g., the display 210 of FIG. 2, the display 330 of FIGS. 3A and 3B, or the display 461 of FIG. 4) may include a flexible display, and the transparent adhesive layer 710 of the protective film structure 700 may be in direct contact with and bonded to the window 701 (e.g., the window 510 of FIG. 5) of the flexible display.

According to one or more embodiments, the transparent adhesive layer 710 may provide an adhesion function while realizing high transparency, high strength, and flexible performance, and the transparent adhesive layer 710 may have hardness of, for example, about 5 H or more, about 6 H or more, or about 7 H or more. The transparent adhesive layer 710 may have light transmittance of, for example, about 80% or more or about 90% or more.

According to one or more embodiments, the transparent adhesive layer 710 may have a thickness of, for example, about 50 nm to about 10 μm, about 50 nm to about 5 μm, about 50 nm to about 1 μm, or about 50 nm to about 300 nm. Accordingly, it is possible to realize flexible performance, durability, and high strength, while preventing degradation of optical performance of the display (e.g., the display 210 of FIG. 2, the display 330 of FIGS. 3A and 3B, or the display 461 of FIG. 4) (e.g., the flexible display).

According to one or more embodiments, the transparent adhesive layer 710 may be implemented to have adhesion strength of, for example, about 750 N/m or more, about 850 N/m or more, or about 1,000 N/m or more (e.g., a test piece is manufactured and measurement is performed based on ASTM D903 or ASTM D2095), and this may be used as a support to achieve high hardness of the hard coating layer.

According to one or more embodiments, the transparent adhesive layer 710 may include one or more of polysilazane, silazane, and siloxane. Accordingly, it is possible to minimize the influence on flexible performance and optical characteristics or improve the flexible performance and the optical characteristics of the display (e.g., the display 210 of FIG. 2, the display 330 of FIGS. 3A and 3B, or the display 461 of FIG. 4) (e.g., the flexible display) while maintaining the high hardness of the hard coating layer 740 in the protective film structure.

According to one or more embodiments, each of polysilazane and silazane may contain organic silazane (e.g., organic polysilazane (OPSZ)), inorganic silazane (e.g., inorganic polysilazane (PHPS)), or both. For example, polysilazane and silazane may be represented by Chemical Formulae 1 and 2 below.

[Chemical Formula 1]

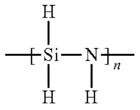

[Chemical Formula 2]

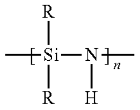

For example, Chemical Formula 1 represents inorganic silazane, Chemical Formula 2 represents organic silazane. In Chemical Formulae 1 and 2, R may be selected from hydrogen, alkyl having 1 to 30 carbon atoms, an alkenyl group having 2 to 30 carbon atoms, and an aryl group having 6 to 20 carbon atoms, and n may be an integer greater than or equal to 1, greater than or equal to 50, or greater than or equal to 100.

According to one or more embodiments, polysilazane may have a molecular weight (e.g., Mn or Mw) of, for example, about 1,500 g/mol or more, about 3,000 g/mol or more, about 6,000 g/mol or more, or about 1,500 g/mol to about 5,000 g/mol. This may improve the adhesive power between the window 701 and the base layer 730, improve the strength (e.g., adhesion strength or peeling strength) and the transparency of the transparent adhesive layer 710, and realize the flexible performance.

According to one or more embodiments, siloxane is a compound containing silicon, oxygen, and hydrogen among compounds having a —Si—O— bond, and may, for example, be represented by Chemical Formula 3 below.

[Chemical Formula 3]

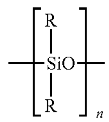

In Chemical Formula 3, R may be selected from hydrogen, an alkyl having 1 to 30 carbon atoms, an alkenyl group having 2 to 30 carbon atoms, and an aryl group having 6 to 20 carbon atoms, and n may be an integer greater than or equal to 1, greater than or equal to 50, or greater than or equal to 100. For example, it may be (—$H_2$SiO-)n (e.g., n is an integer greater than or equal to 2, disiloxane, trisiloxane).

According to one or more embodiments, the primer layer 720 may be disposed between the transparent adhesive layer 710 and the base layer 730 to increase the adhesive power between the transparent adhesive layer 710 and the base layer 730. The primer layer 720 may, for example, include a polymer resin having the same coating material or silane structure as that of the hard coating layer 740, a self-adhesive type transparent adhesive, or both. The polymer resin having a silane structure may, for example, include at least one of a silane primer, an acrylic silane primer, a silane glass primer, and an amino silane primer. According to one or more embodiments, the transparent adhesive may include, for example, at least one of an OCA, an OCR, a PSA, an epoxy-based adhesive, a silicone-based adhesive, an acrylic adhesive, and a urethane-based adhesive. According to one or more embodiments, the primer layer 720 may have a thickness of, for example, about 0.1 μm to about 5 μm, and this may provide the adhesive power while minimizing or preventing the degradation of the transparency and the flexible performance.

According to one or more embodiments, the base layer 730 may be a base film with flexible performance disposed between the hard coating layer 740 and the transparent adhesive layer 710, and the base layer 730 may be a transparent film having durability. The transparent film may include, for example, glass, a polymer, or both. The polymer may include at least one of polyester, polyethylene, PET, polypropylene, PDMS, poly-4-vinylphenol, polymethyl methacrylate, polyvinylidene fluoride, polystyrene, polycarbonate, PI, cellulose, polyvinyl chloride, polytetrafluoroethylene, polyvinyl alcohol, and TPU.

According to one or more embodiments, the base layer 730 may be used as a support suitable for the realization of the protective function of the hard coating layer 740 and the flexible performance, and may minimize or prevent damage on the optical characteristics of the display (e.g., the display 210 of FIG. 2, the display 330 of FIGS. 3A and 3B, or the display 461 of FIG. 4), and the base layer 730 may have a thickness of, for example, about 40 μm to about 70 μm, about 40 μm to about 60 μm, or about 45 μm to about 50 μm. The base layer 730 may have light transmittance (e.g., in a range of wavelengths of 400 nm to 800 nm) of, for example, about 80% or more or about 90% or more.

According to one or more embodiments, the hard coating layer 740 may provide the protective function of the display (e.g., the display 210 of FIG. 2, the display 330 of FIGS. 3A and 3B, or the display 461 of FIG. 4) from external factors and/or a user, and may be formed on the base layer 730. The hard coating layer 740 may realize the flexible performance while providing high hardness and high light transmittance of the hard coating layer 740 with the introduction of the transparent adhesive layer 710. The hard coating layer 740 may have a thickness of, for example, about 5 μm to about 70 μm, about 15 μm to about 70 μm, or about 20 μm to about 60 μm. The hard coating layer 740 may have pencil hardness of, for example, about 7 H or more or about 8 H or more, and may realize high hardness with a thin thickness.

According to one or more embodiments, the hard coating layer 740 may have flexural strength of, for example, about 2.0 R or more (e.g., a test piece is manufactured based on ASTM D790). The hard coating layer 740 may have a repulsive power of, for example, about 5.0 N or less, about 4.0 N or less, or about 3.0 N or less, and may realize the flexible performance with high hardness.

According to one or more embodiments, the hard coating layer 740 may have light transmittance (e.g., in a range of wavelengths of 400 nm to 800 nm) of, for example, about 80% or more or about 90% or more. This may minimize or prevent damage on the optical characteristics of the display (e.g., the display 210 of FIG. 2, the display 330 of FIGS. 3A and 3B, or the display 461 of FIG. 4).

According to one or more embodiments, the hard coating layer 740 may include, for example, at least one of an organic material (e.g., a polyurethane-based resin, an acrylate-based resin, an urethane acrylate-based resin, a (meth) acrylate-based resin, a silicone acrylate-based resin, an epoxy acrylate-based resin, an epoxy-based resin, or a silicone-based resin), an inorganic material (e.g., oxide of $ZrO_2$, $SiO_2$, or $Al_2O_3$), nanocomposite (e.g., HACAF or HABCAF), and a silicone-based organic and inorganic hybrid hard coating material, but embodiments are not limited thereto.

According to one or more embodiments, the hard coating layer 740 may further include a functional layer on a surface, inside, or both of the hard coating layer 740. The functional layer may, for example, include an anti-fouling layer including one or more of anti-fingerprint coating (water-repellent/oil-repellent), anti-scratch coating (hydrophilic/lipophilic), and invisible fingerprint (IF) coating, and the anti-fouling layer may provide, for example, fingerprint resistance performance.

According to one or more embodiments, the protective film structure 700 may form the hard coating layer 740 on one surface of the base layer 730, and may sequentially form and laminate the primer layer 720 and the transparent adhesive layer 710 on the other surface of the base layer 730. According to one or more embodiments, one or more of spin coating, spray coating, dip coating, flow coating, bar coating, die coating, slot coating, printing coating, a sol-gel method, and a lamination method may be used, but embodiments are not limited thereto. According to one or more embodiments, the strength, the hardness, and/or the adhesive power may be increased by adding heat curing and light curing (e.g., UV curing, a light intensity of about 10 $mJ/cm^2$ to about 1,000 $mJ/cm^2$ at a wavelength of 400 nm or less).

According to one or more embodiments, the transparent adhesive layer 710 may further include a lattice pattern (lattice structure (LS)) and may improve the flexible realization of the display (e.g., the display 210 of FIG. 2, the display 330 of FIGS. 3A and 3B, or the display 461 of FIG. 4) (e.g., the flexible display) by the protective film structure. The lattice pattern may, for example, improve mechanical strength and durability of the transparent adhesive layer 710 while improving folding, bending, and/or rolling performance of the display.

According to one or more embodiments, the lattice pattern may, for example, include one or more of a straight pattern, a diagonal pattern, or a geometric mesh (or grid) pattern. The geometric mesh pattern may be selected from, for example, a polygon, circle, oval, and star. A polygon may include one or more of a triangle (e.g., an equilateral triangle, isosceles triangle, or right triangle), a square (e.g., a square, rectangle, rhombus, parallelogram, or trapezoid), or a regular n-gon (e.g., a regular hexagon or equilateral octagon). For example, the geometric mesh pattern may include a honeycomb pattern in which regular hexagons are arranged.

According to one or more embodiments, the lattice pattern may, for example, be formed on at least a portion (e.g., locally) or the entire portion of the transparent adhesive layer 710. An area of a region where the lattice pattern is formed may be, for example, about 99% or less, about 80% or less, about 60% or less, about 50% or less, about 30% or less, or about 10% or less of the entire area of the transparent adhesive layer 710. The lattice pattern may have a line thickness of, for example, about 100 nm to about 10 μm; about 100 nm to about 5 μm; or about 100 nm to about 1 μm.

According to one or more embodiments, in FIGS. 7A and 7C, a lattice pattern area LS may, for example, be formed in an area corresponding to an area (e.g., an area around an axis A) including a folding axis or a bending axis (e.g., the axis A of FIG. 3 or the axis A of FIG. 5) of the window 701. For a lattice pattern area LS-1, for example, a single area or a plurality of areas may be arranged within an area corresponding to a folding or bending area of the flexible display. For example, the plurality of lattice pattern areas may be randomly or regularly arranged in parallel with and/or perpendicularly to a direction of the folding axis or the bending axis. According to one or more embodiments, in FIGS. 7B and 7D, a plurality of lattice pattern areas LS-1, LS-2, and LS-3, for example, may be formed in a portion or over the entire portion of the transparent adhesive layer 710 to smoothly perform the rolling of the flexible display and improve the hardness and durability of the hard coating layer 740.

According to one or more embodiments, the shape of the lattice pattern areas LS-1, LS-2, and LS-3 may be, for example, a geometric or dot shape. The geometric shape is as described above.

According to one or more embodiments, the lattice pattern or the lattice pattern area may be formed using one or more of etching, the use of a mask (e.g., a mask film or a maskant), photolithography, or an ink jet.

Figure 8A:
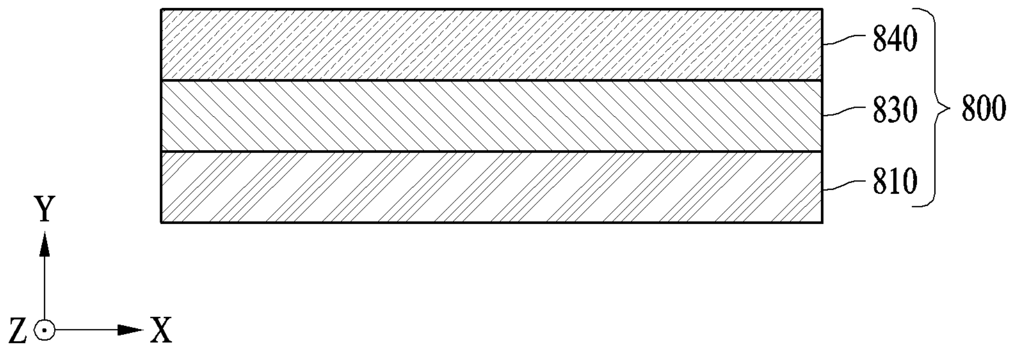
FIG. 8A is a cross-sectional view of a protective film structure according to one or more embodiments.
Figure 8B:
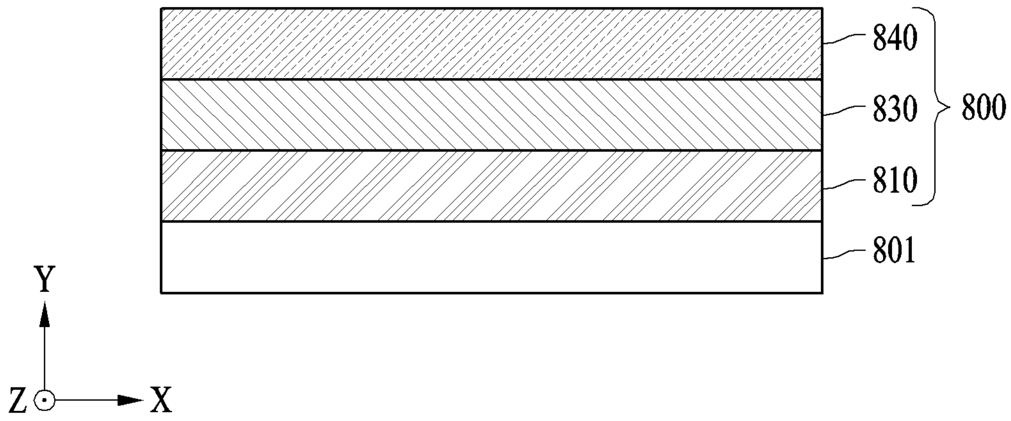
FIG. 8B is a cross-sectional view of a protective film structure which is attached to a window of a display according to one or more embodiments.

FIG. 8A shows a cross-sectional view of a protective film structure 800 according to one or more embodiments, and FIG. 8B shows a cross-sectional view of the protective film structure 800 attached to a window 801 of a display according to one or more embodiments.

Referring to FIGS. 8A and 8B, in the protective film structure 800, a transparent adhesive layer 810, a base layer 830, and a hard coating layer 840 may be laminated in order. The protective film structure 800 may be disposed on at least one surface of the window 801 (e.g., the window 510 of FIG. 5) of the display (e.g., the display 210 of FIG. 2, the display 330 of FIGS. 3A and 3B, or the display 461 of FIG. 4). Some configurations of the display may be omitted or briefly shown in FIG. 8B.

According to one or more embodiments, in FIG. 8B, the display (e.g., the display 210 of FIG. 2, the display 330 of FIGS. 3A and 3B, or the display 461 of FIG. 4) may include a flexible display, and the transparent adhesive layer 810 of the protective film structure 800 may be in direct contact with and bonded to the window 801 (e.g., the window 510 of FIG. 5) of the flexible display.

According to one or more embodiments, the transparent adhesive layer 810 may provide an adhesion function while realizing high transparency, high strength, and flexible performance, and the transparent adhesive layer 810 may have a hardness of, for example, about 5 H or more, about 6 H or more, or about 7 H or more. The transparent adhesive layer 810 may have light transmittance of, for example, about 80% or more or about 90% or more.

According to one or more embodiments, the transparent adhesive layer 810 may have a thickness of, for example, about 50 nm to about 10 μm, about 50 nm to about 10 μm, about 50 nm to about 5 μm, about 50 nm to about 1 μm, or about 50 nm to about 300 nm. Accordingly, flexible performance, durability, and high strength may be realized, while preventing degradation of optical performance of the display (e.g., the display 210 of FIG. 2, the display 330 of FIGS. 3A and 3B, or the display 461 of FIG. 4) (e.g., the flexible display).

According to one or more embodiments, the transparent adhesive layer 810 may have an adhesion strength of, for example, about 750 N/m or more, about 850 N/m or more, or about 1,000 N/m or more (e.g., a test piece is manufactured based on ASTM D903 or ASTM D2095), and may be used as a support to achieve high hardness of the hard coating layer 840. In addition, the transparent adhesive layer 810 may improve the optical performance (e.g., visibility) of the display (e.g., the display 210 of FIG. 2, the display 330 of FIGS. 3A and 3B, or the display 461 of FIG. 4).

According to one or more embodiments, the transparent adhesive layer 810 may include nanoparticles and a transparent adhesive. The transparent adhesive may include, for example, at least one of an OCA, an OCR, an epoxy-based adhesive, a silicone-based adhesive, an acrylic adhesive, and a urethane-based adhesive, however, embodiments are not limited thereto.

According to one or more embodiments, the nanoparticles may be uniformly mixed or dispersed in a base matrix which is a transparent adhesive to provide the adhesive power between a base material (e.g., a window film or a flexible display substrate) and the protective film structure 800, which may improve strength (e.g., adhesion strength or peeling strength) and transparency of the transparent adhesive layer 810, and may realize the flexible performance. The nanoparticles may improve the mechanical strength, and hardness and abrasion resistance of the transparent adhesive layer 810. For example, the uniformly dispersed nanoparticles may absorb shock from a surface of the protective film structure 800, and the mechanical strength may be locally improved. In addition, an effect of a hard substrate that maintains the high-hardness hard coating performance formed on the base layer 830 may be provided. In addition, the optical performance of an adhesive surface may be improved with high light transmittance of the nanoparticles and visibility with a viewing angle may be improved through particle adjustment, thereby improving performance by improving visibility of the display (e.g., the display 210 of FIG. 2, the display 330 of FIGS. 3A and 3B, or the display 461 of FIG. 4) (e.g., the flexible display).

According to one or more embodiments, the nanoparticles may have a particle size of, for example, about 300 nm or less, about 250 nm or less, about 200 nm or less, about 100 nm or less, about 50 nm or less (e.g., about less than 50 nm), about 30 nm or less (e.g., about less than 30 nm), about 25 nm or less (e.g., about less than 25 nm), or about 10 nm or less, or a particle size of about 5 nm or more, about 9 nm or more, or about 15 nm or more, and the nanoparticles may be dispersed in the adhesive. Therefore, the flexible performance of the base layer 830 may be maintained while maintaining strong adhesive power of the adhesive. The shape of the various nanoparticles may include at least one of a sphere, nanoplatelet, fiber, needle, wire, plate, and tube, and the particle size may be an average particle size and may refer to a diameter, radius, length, thickness, inner diameter, or outer diameter according to the shape of the nanoparticles.

According to one or more embodiments, the nanoparticles may, for example, include one or more of an organic component, an inorganic component, and ceramic. For example, the nanoparticles may include at least one of silicon (Si), titanium (Ti), tantalum (Ta), zirconium (Zr), boron (B), aluminum (Al), magnesium (Mg), zinc (Zn), tin (Sn), cerium (Ce), vanadium (V), chromium (Cr), antimony (Sb), and oxides thereof. For example, one of silica, titania, alumina, zirconia, vanadia, chromia ($Cr_2O_3$), antimony oxide, tin oxide, zinc oxide, and ceria may be selected.

According to one or more embodiments, the nanoparticles may include particles having a core-shell structure, and a core may have a particle size of about 200 nm or less, about 100 nm or less, about 50 nm or less (e.g., about less than 50 nm), about 30 nm or less (e.g., about less than 30 nm), about 25 nm or less (e.g., about less than 25 nm), or about 10 nm or less, or an average size (e.g., an average diameter) of about 5 nm or more, about 9 nm or more, or about 15 nm or more within a range of the particle size to be interfered by light. According to one or more embodiments, each of the core and the shell may include one or more of an organic component, an inorganic component, and ceramic, and may be the same as each other or different from each other, and the component and/or thickness may be the same as each other or different from each other. For example, each of the core and the shell may include at least one of silicon (Si), titanium (Ti), tantalum (Ta), zirconium (Zr), boron (B), aluminum (Al), magnesium (Mg), zinc (Zn), tin (Sn), cerium (Ce), vanadium (V), chromium (Cr), antimony (Sb), and oxides thereof. For example, one of silica, titania, alumina, zirconia, vanadia, chromia, antimony oxide, tin oxide, zinc oxide, and ceria may be selected. According to one or more embodiments, a thickness ratio of the core to the shell may be about 1:about 0.01 to about 1:about 1; or about 1:about 0.1 to about 1:about 0.5, and in such a range, the transparent adhesive layer 810 having high strength and high transparency may be provided.

According to one or more embodiments, the nanoparticles, for example, may be included in an amount of about 1 part by weight to 10 parts by weight with respect to 100 parts by weight of the transparent adhesive. When the nanoparticles are included in such a range of the amount, the nanoparticles may be uniformly dispersed, and the flexible performance and high hardness of the hard coating layer 840 may be realized while maintaining high strength and high transparency of the transparent adhesive layer 810. In addition, the degradation of the optical characteristics of the display (e.g., the display 210 of FIG. 2, the display 330 of FIGS. 3A and 3B, or the display 461 of FIG. 4) may be minimized or prevented.

According to one or more embodiments, the base layer 830 may be a base film with flexible performance which is disposed between the hard coating layer 840 and the transparent adhesive layer 810, and the base layer 830 may be a transparent film having durability. The transparent film may include, for example, glass, a polymer, or both. The polymer may include at least one of polyester, polyethylene, PET, polypropylene, PDMS, poly-4-vinylphenol, polymethyl methacrylate, polyvinylidene fluoride, polystyrene, polycarbonate, PI, cellulose, polyvinyl chloride, polytetrafluoroethylene, polyvinyl alcohol, and polyurethane (e.g., TPU).

According to one or more embodiments, the base layer 830 may be used as a support suitable for the realization of the protective function of the hard coating layer 840 and the flexible performance, and may minimize or prevent damage on the optical characteristics of the display (e.g., the display 210 of FIG. 2, the display 330 of FIGS. 3A and 3B, or the display 461 of FIG. 4), and the base layer 830 may have a thickness of, for example, about 40 μm to about 70 μm, about 40 μm to about 60 μm, or about 45 μm to about 50 μm. The base layer 830 may have light transmittance (e.g., in a range of wavelengths of 400 nm to 800 nm) of, for example, about 80% or more or about 90% or more.

According to one or more embodiments, the hard coating layer 840 may have the protective function of the display (e.g., the display 210 of FIG. 2, the display 330 of FIGS. 3A and 3B, or the display 461 of FIG. 4) from external factors and/or a user, and may be formed on the base layer 830. The hard coating layer 840 may realize the flexible performance while providing high hardness and high light transmittance of the hard coating layer 840 with the introduction of the transparent adhesive layer 810. The hard coating layer 840 may have a thickness of, for example, about 5 μm to about 70 μm, about 15 μm to about 70 μm, or about 20 μm to about 60 μm. The hard coating layer 840 may have pencil hardness of, for example, about 7 H or more or about 8 H or more, and this may realize high hardness with a thin thickness.

According to one or more embodiments, the hard coating layer 840 may have flexural strength of, for example, about 2.0 R or more (e.g., a test piece is manufactured based on ASTM D790). The hard coating layer 840 may have a repulsive power of, for example, about 5.0 N or less, about 4.0 N or less, or about 3.0 N or less, and this may realize the flexible performance with high hardness. The hard coating layer 840 may have light transmittance (e.g., in a range of wavelengths of 400 nm to 800 nm) of, for example, about 80% or more or about 90% or more. This may minimize or prevent damage on the optical characteristics of the display (e.g., the display 210 of FIG. 2, the display 330 of FIGS. 3A and 3B, or the display 461 of FIG. 4) (e.g., the flexible display).

According to one or more embodiments, the hard coating layer 840 may include, for example, at least one of an organic material (e.g., a polyurethane-based resin, an acrylate-based resin, an urethane acrylate-based resin, a (meth) acrylate-based resin, a silicone acrylate-based resin, an epoxy acrylate-based resin, an epoxy-based resin, or a silicone-based resin), an inorganic material (e.g., oxide of $ZrO_2$, $SiO_2$, or $Al_2O_3$), nanocomposite (e.g., HACAF or HABCAF), and a silicone-based organic and inorganic hybrid hard coating material, but embodiments are not limited thereto.

According to one or more embodiments, the hard coating layer 840 may further include a functional layer on a surface, inside, or both of the hard coating layer 840. The functional layer may, for example, include an anti-fouling layer including one or more of anti-fingerprint coating (water-repellent/oil-repellent), anti-scratch coating (hydrophilic/lipophilic), and invisible fingerprint (IF) coating, and the anti-fouling layer may provide, for example, fingerprint resistance performance.

According to one or more embodiments, the protective film structure 800 may form the hard coating layer 840 on one surface of the base layer 830, and may form and laminate the transparent adhesive layer 810 on the other surface of the base layer 830. According to some embodiments, one or more of spin coating, spray coating, dip coating, flow coating, bar coating, die coating, slot coating, printing coating, a sol-gel method, and a lamination method may be used, but embodiments are not limited thereto. According to one or more embodiments, the strength, the hardness, and/or the adhesive power may be increased by adding heat curing and light curing (e.g., UV curing, a light intensity of about 10 $mJ/cm^2$ to about 1,000 $mJ/cm^2$ at a wavelength of 400 nm or less).

Figure 9A:
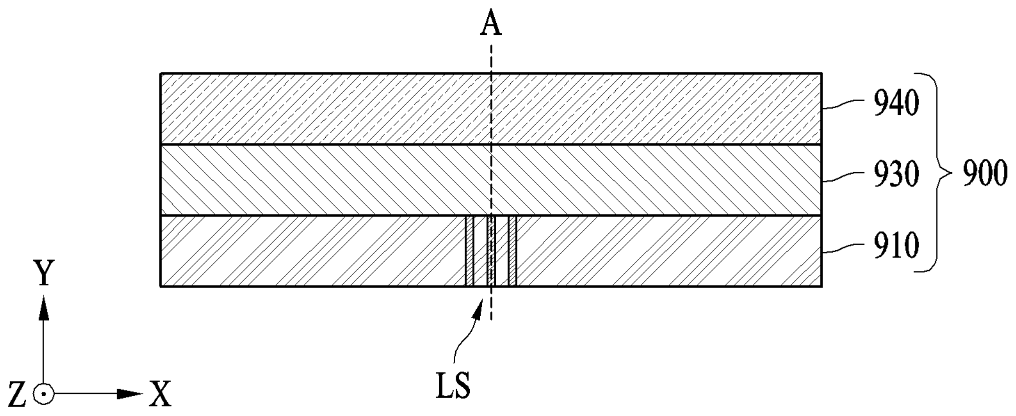
FIG. 9A is a cross-sectional view of a protective film structure according to one or more embodiments.
Figure 9B:
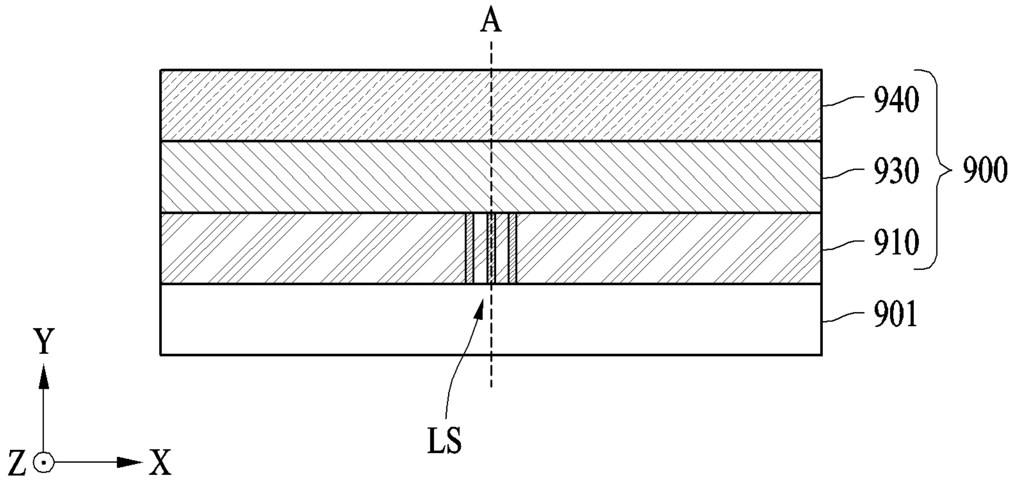
FIG. 9B is a cross-sectional view of a protective film structure according to one or more embodiments.
Figure 9C:
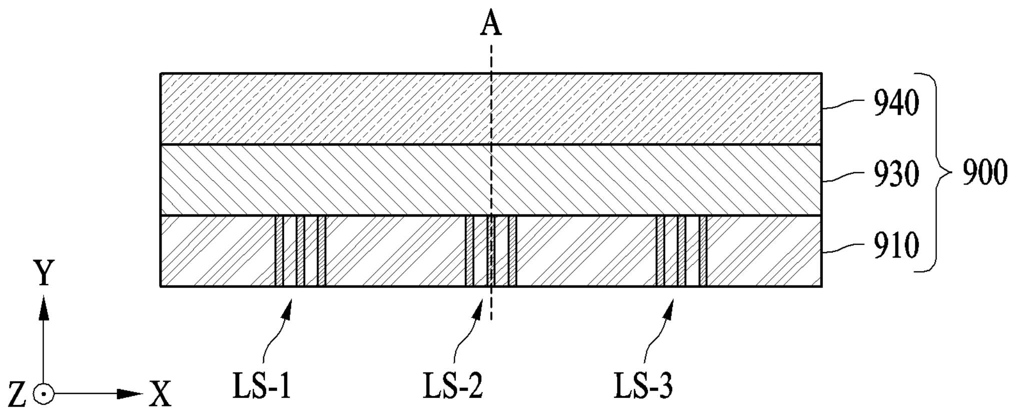
FIG. 9C is a cross-sectional view of a protective film structure which is attached to a window of a display according to one or more embodiments.
Figure 9D:
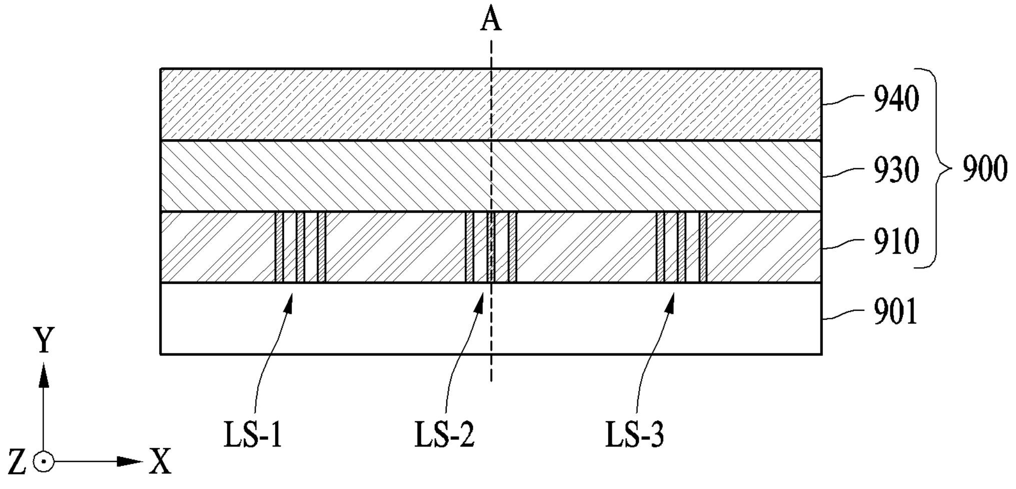
FIG. 9D is a cross-sectional view of a protective film structure which is attached to a window of a display according to one or more embodiments.

FIGS. 9A and 9B show cross-sectional views of a protective film structure 900 according to one or more embodiments, and FIGS. 9C and 9D show cross-sectional views of the protective film structure 900 attached to a window 901 of a display according to one or more embodiments.

Referring to FIGS. 9A, 9B, 9C, and 9D, in the protective film structure 900, a transparent adhesive layer 910, a base layer 930, and a hard coating layer 940 may be laminated in order. The protective film structure 900 may be disposed on at least one surface of the window 901 of the display (e.g., the display 210 of FIG. 2, the display 330 of FIGS. 3A and 3B, or the display 461 of FIG. 4). Some configurations of the display may be omitted or briefly shown in FIGS. 9C and 9D.

According to one or more embodiments, in FIGS. 9C and 9D, the display (e.g., the display 210 of FIG. 2, the display 330 of FIGS. 3A and 3B, or the display 461 of FIG. 4) may include a flexible display, and the transparent adhesive layer 910 of the protective film structure 900 may be in direct contact with and bonded to the window 901 (e.g., the window 510 of FIG. 5) of the flexible display.

According to one or more embodiments, the transparent adhesive layer 910 may provide an adhesion function while realizing high transparency, high strength, and flexible performance, and the transparent adhesive layer 910 may have a hardness of, for example, about 5 H or more, about 6 H or more, or about 7 H or more. The transparent adhesive layer 910 may have light transmittance of, for example, about 80% or more or about 90% or more.

According to one or more embodiments, the transparent adhesive layer 910 may have a thickness of, for example, about 50 nm to about 30 μm, about 50 nm to about 10 μm, about 50 nm to about 5 μm, about 50 nm to about 1 μm, or about 50 nm to about 300 nm. Accordingly, flexible performance, durability, and high strength may be realized, while preventing degradation of optical performance of the display (e.g., the display 210 of FIG. 2, the display 330 of FIGS. 3A and 3B, or the display 461 of FIG. 4) (e.g., the flexible display).

According to one or more embodiments, the transparent adhesive layer 910 may be implemented to have adhesion strength of, for example, about 750 N/m or more, about 850 N/m or more, or about 1,000 N/m or more (e.g., a test piece is manufactured based on ASTM D903 or ASTM D2095), and this may be used as a support to achieve high hardness of the hard coating layer. In addition, the transparent adhesive layer 910 may improve the optical performance (e.g., visibility) of an electronic device 901.

According to one or more embodiments, the transparent adhesive layer 910 may include nanoparticles and a transparent adhesive. The transparent adhesive may include, for example, at least one of an OCA, an OCR, an epoxy-based adhesive, a silicone-based adhesive, an acrylic adhesive, and a urethane-based adhesive, however, embodiments are not limited thereto.

According to one or more embodiments, the nanoparticles may be uniformly mixed or dispersed in a base matrix which is a transparent adhesive to provide the adhesive power between a base material (e.g., a window film or a flexible display substrate) or the window 901 and the protective film structure 900, improve strength (e.g., adhesion strength or peeling strength) and transparency of the transparent adhesive layer 910, and realize the flexible performance. The nanoparticles may improve the mechanical strength, and hardness and abrasion resistance of the transparent adhesive layer 910. For example, the uniformly dispersed nanoparticles may absorb shock from a surface of the protective film structure 900, and the mechanical strength may be locally improved. In addition, an effect of a hard substrate that maintains the high-hardness hard coating performance formed on the base layer 930 may be provided. In addition, the optical performance of an adhesive surface may be improved with high light transmittance of the nanoparticles and visibility with a viewing angle may be improved through particle adjustment, thereby improving performance by improving visibility of the display (e.g., the display 210 of FIG. 2, the display 330 of FIGS. 3A and 3B, or the display 461 of FIG. 4) (e.g., the flexible display).

According to one or more embodiments, the nanoparticles may have a particle size of, for example, about 300 nm or less, about 250 nm or less, about 200 nm or less, about 100 nm or less, about 50 nm or less (e.g., about less than 50 nm), about 30 nm or less (e.g., about less than 30 nm), about 25 nm or less (e.g., about less than 25 nm), or about 10 nm or less, or a particle size of about 5 nm or more, about 9 nm or more, or about 15 nm or more, and the dispersion of the nanoparticles in the adhesive is performed in an excellent manner. Therefore, the flexible performance of the base layer 830 may be maintained while maintaining strong adhesive power of the adhesive. The shape of the nanoparticles may include at least one of a sphere, nanoplatelet, fiber, needle, wire, plate, and tube, and the particle size may be an average particle size and may refer to a diameter, radius, length, thickness, inner diameter, or outer diameter according to the shape of the nanoparticles.

According to one or more embodiments, the nanoparticles may, for example, include one or more of an organic component, an inorganic component, and ceramic. For example, the nanoparticles may include at least one of silicon (Si), titanium (Ti), tantalum (Ta), zirconium (Zr), boron (B), aluminum (Al), magnesium (Mg), zinc (Zn), tin (Sn), cerium (Ce), vanadium (V), chromium (Cr), antimony (Sb), and oxides thereof. For example, one of silica, titania, alumina, zirconia, vanadia, chromia ($Cr_2O_3$), antimony oxide, tin oxide, zinc oxide, and ceria may be selected.

According to one or more embodiments, the nanoparticles may include particles having a core-shell structure, and a core may have a particle size of about 200 nm or less, about 100 nm or less, about 50 nm or less (e.g., about less than 50 nm), about 30 nm or less (e.g., about less than 30 nm), about 25 nm or less (e.g., about less than 25 nm), or about 10 nm or less, or an average size (e.g., an average diameter) of about 5 nm or more, about 9 nm or more, or about 15 nm or more within a range of the particle size to be interfered by light. According to one or more embodiments, each of the core and shell may include one or more of an organic component, an inorganic component, and ceramic, and may be the same as each other or different from each other, and the component and/or thickness may be the same as each other or different from each other. For example, the core-shell may include at least one of silicon (Si), titanium (Ti), tantalum (Ta), zirconium (Zr), boron (B), aluminum (Al), magnesium (Mg), zinc (Zn), tin (Sn), cerium (Ce), vanadium (V), chromium (Cr), antimony (Sb), and oxides thereof. For example, one of silica, titania, alumina, zirconia, vanadia, chromia, antimony oxide, tin oxide, zinc oxide, and ceria may be selected. According to one or more embodiments, a thickness ratio of the core to the shell may be about 1:about 0.01 to about 1:about 1; or about 1:about 0.1 to about 1:about 0.5, and in such a range, the transparent adhesive layer 910 having high strength and high transparency may be provided.

According to one or more embodiments, the nanoparticles, for example, may be included in an amount of about 1 part by weight to 10 parts by weight with respect to 100 parts by weight of the transparent adhesive. When the nanoparticles are included in such a range of the amount, the nanoparticles may be uniformly dispersed, and the flexible performance and high hardness of the hard coating layer 940 may be realized while maintaining high strength and high transparency of the transparent adhesive layer 910. In addition, the degradation of the optical characteristics of the display (e.g., the display 210 of FIG. 2, the display 330 of FIGS. 3A and 3B, or the display 461 of FIG. 4) may be minimized or prevented.

According to one or more embodiments, the base layer 930 may be a base film with flexible performance disposed between the hard coating layer 940 and the transparent adhesive layer 910, and the base layer 930 may be a transparent film having durability. The transparent film may include, for example, glass, a polymer, or both. The polymer may include at least one of polyester, polyethylene, PET, polypropylene, PDMS, poly-4-vinylphenol, polymethyl methacrylate, polyvinylidene fluoride, polystyrene, polycarbonate, PI, cellulose, polyvinyl chloride, polytetrafluoroethylene, polyvinyl alcohol, and polyurethane (e.g., TPU).

According to one or more embodiments, the base layer 930 may be used as a support suitable for the realization of the protective function of the hard coating layer 940 and the flexible performance, and may minimize or prevent damage on the optical characteristics of the display (e.g., the display 210 of FIG. 2, the display 330 of FIGS. 3A and 3B, or the display 461 of FIG. 4), and the base layer 930 may have a thickness of, for example, about 40 μm to about 70 μm, about 40 μm to about 60 μm, or about 45 μm to about 50 μm. The base layer 930 may have light transmittance (e.g., in a range of wavelengths of 400 nm to 800 nm) of, for example, about 80% or more or about 90% or more.

According to one or more embodiments, the hard coating layer 940 may have the protective function of the display (e.g., the display 210 of FIG. 2, the display 330 of FIGS. 3A and 3B, or the display 461 of FIG. 4) from external factors and/or a user, and may be formed on the base layer 930. The hard coating layer 940 may realize the flexible performance while providing high hardness and high light transmittance of the hard coating layer 940 with the introduction of the transparent adhesive layer 910. The hard coating layer 940 may have a thickness of, for example, about 5 μm to about 70 μm, about 15 μm to about 70 μm, or about 20 μm to about 60 μm. The hard coating layer 940 may have surface hardness of, for example, about 7 H or more or about 8 H or more, and this may realize high hardness with a thin thickness. The hard coating layer 940 may have flexural strength of, for example, about 2.0 R or more (e.g., a test piece is manufactured and measurement is performed based on ASTM D790). The hard coating layer 940 may have a repulsive power of, for example, about 5.0 N or less, about 4.0 N or less, or about 3.0 N or less, and this may realize the flexible performance with high hardness. The hard coating layer 940 may have light transmittance (e.g., in a range of wavelengths of 400 nm to 800 nm) of, for example, about 80% or more or about 90% or more. This may minimize or prevent damage on the optical characteristics of the display (e.g., the display 210 of FIG. 2, the display 330 of FIGS. 3A and 3B, or the display 461 of FIG. 4). In addition, an effect of improving the optical characteristics may be provided.

According to one or more embodiments, the hard coating layer 940 may include, for example, at least one of an organic material (e.g., a polyurethane-based resin, an acrylate-based resin, an urethane acrylate-based resin, a (meth) acrylate-based resin, a silicone acrylate-based resin, an epoxy acrylate-based resin, an epoxy-based resin, or a silicone-based resin), an inorganic material (e.g., oxide of $ZrO_2$, $SiO_2$, or $Al_2O_3$), nanocomposite (e.g., HACAF or HABCAF), and a silicone-based organic and inorganic hybrid hard coating material, but embodiments are not limited thereto.

According to one or more embodiments, the hard coating layer 840 may further include a functional layer on a surface, inside, or both of the hard coating layer 940. The functional layer may, for example, include an anti-fouling layer including one or more of anti-fingerprint coating (water-repellent/oil-repellent), anti-scratch coating (hydrophilic/lipophilic), and invisible fingerprint (IF) coating, and the anti-fouling layer may provide, for example, fingerprint resistance performance.

According to one or more embodiments, the protective film structure 900 may form the hard coating layer 940 on one surface of the base layer 930, and may form and laminate the transparent adhesive layer 910 on the other surface of the base layer 930. One or more of spin coating, spray coating, dip coating, flow coating, bar coating, die coating, slot coating, printing coating, a sol-gel method, and a lamination method may be used, but embodiments are not limited thereto. According to one or more embodiments, the strength, the hardness, and/or the adhesive power may be increased by adding heat curing and light curing (e.g., UV curing, a light intensity of about 10 $mJ/cm^2$ to about 1,000 $mJ/cm^2$ at a wavelength of 400 nm or less).

According to one or more embodiments, the transparent adhesive layer 910 may further include a lattice pattern (lattice structure (LS)) and may improve the flexible realization of the display (e.g., the display 210 of FIG. 2, the display 330 of FIGS. 3A and 3B, or the display 461 of FIG. 4) by the protective film structure 900. The lattice pattern LS may, for example, improve mechanical strength and durability of the transparent adhesive layer 910 while improving folding, bending, and/or rolling performance of the display.

According to one or more embodiments, the lattice pattern may, for example, include one or more of a straight pattern, a diagonal pattern, or a geometric mesh (or grid) pattern. The geometric mesh pattern may be selected from, for example, a polygon, circle, oval, and star. A polygon may include one or more of a triangle (e.g., an equilateral triangle, isosceles triangle, or right triangle), a square (e.g., a square, rectangle, rhombus, parallelogram, or trapezoid), or a regular n-gon (e.g., a regular hexagon or equilateral octagon). For example, the geometric mesh pattern may include a honeycomb pattern in which regular hexagons may be arranged.

According to one or more embodiments, the lattice pattern may, for example, be formed on at least a portion (e.g., locally) or the entire portion of the transparent adhesive layer 910. An area of a region where the lattice pattern is formed may be, for example, about 99% or less, about 80% or less, about 60% or less, about 50% or less, about 30% or less, or about 10% or less of the entire area of the transparent adhesive layer 910. The lattice pattern may have a line thickness of, for example, about 100 nm to about 10 μm, about 100 nm to about 5 μm; or about 100 nm to about 1 μm.

According to one or more embodiments, in FIGS. 9A and 9C, a lattice pattern area LS may, for example, be formed in an area corresponding to an area (e.g., an area around an axis A) including a folding axis or a bending axis (e.g., the axis A of FIG. 3 or the axis A of FIG. 5) of the window 901. For a lattice pattern area LS-1, for example, a single area or a plurality of areas may be arranged within an area corresponding to a folding or bending area of the flexible display. For example, the plurality of lattice pattern areas may be randomly or regularly arranged in parallel with and/or perpendicularly to a direction of the folding axis or the bending axis. According to one or more embodiments, in FIGS. 9B and 9D, a plurality of lattice pattern areas LS-1, LS-2, and LS-3, for example, may be formed in a portion or over the entire portion of the transparent adhesive layer 910 to smoothly perform the rolling of the flexible display and improve the hardness and durability of the hard coating layer 940.

According to one or more embodiments, the shape of the lattice pattern areas LS-1, LS-2, and LS-3 may be, for example, a geometric or dot shape. The geometric shape is as described above.

According to one or more embodiments, the lattice pattern or the lattice pattern area may be formed using one or more of etching, the use of a mask (e.g., a mask film or a maskant), photolithography, or an ink jet.

According to one or more embodiments, it may be possible to provide a protective film structure that realizes flexibility while maintaining hard coating performance with high hardness (e.g., pencil hardness of 7 H or higher) at a level of tempered glass, and has improved durability by maintaining high adhesion. The protective film structure may be used as a protective film of a flexible display that may be applied to an electronic device (e.g., a television, a smartphone, a watch, or a tablet personal computer) including a flexible display.

According to one or more embodiments, it may be possible to provide an electronic device including a protective film structure that protects damages (e.g., an impact, pen pressing, nail scratches, or scratches) to a display due to external factors and/or a user, and has improved impact resistance strength and durability of a display.

The electronic device according to various embodiments may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," may include any one of the items listed together in the corresponding one of the phrases, or all possible combinations thereof. For example, the expression, "at least one of A, B, and C," should be understood as including only A, only B, only C, both A and B, both A and C, both B and C, or all of A, B, and C. Terms such as "$1^{st}$", "$2^{nd}$", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, According to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

What is claimed is:

1. A protective film structure comprising:

a hard coating layer;

a transparent adhesive layer;

a base layer between the hard coating layer and the transparent adhesive layer; and a primer layer between the transparent adhesive layer and the base layer, wherein the transparent adhesive layer comprises at least one of polysilazane or silazane, and wherein the primer layer or the hard coating layer comprises a polymer resin including a silane structure.

2. The protective film structure of claim 1, wherein the transparent adhesive layer has at least one of a thickness of 50 nm to 30 μm, an adhesion strength of at least 750 N/m, or a light transmittance of at least 80%.

3. The protective film structure of claim 1, wherein the transparent adhesive layer further comprises siloxane, and wherein the transparent adhesive layer comprises polysilazane having a molecular weight of 1,500 g/mol or more.

4. The protective film structure of claim 1, wherein at least a portion of the transparent adhesive layer comprises a lattice pattern, wherein the lattice pattern has a line thickness of 100 nm to 10 μm, and wherein the lattice pattern comprises at least one of a straight pattern, a diagonal pattern, and a geometric mesh pattern.

5. The protective film structure of claim 1, wherein the primer layer has a thickness of 0.1 μm to 5 μm, and wherein each of the primer layer and the hard coating layer comprises a first coating material.

6. The protective film structure of claim 1, wherein the hard coating layer has at least one of a thickness of 5 μm to 70 μm, a pencil hardness of at least 7 H, or a flexural strength of at least 2.0 R.

7. The protective film structure of claim 1, wherein the hard coating layer comprises a functional layer on an outer surface of the hard coating layer, on an inner surface of the hard coating layer, or both on the outer surface and the inner surface of the hard coating layer, and wherein the functional layer comprises an anti-fouling layer.

8. An electronic device comprising:

a flexible display; and a protective film structure provided on the flexible display, wherein the protective film structure comprises:

a hard coating layer;

a transparent adhesive layer;

a base layer between the hard coating layer and the transparent adhesive layer; and a primer layer between the transparent adhesive layer and the base layer, wherein the transparent adhesive layer comprises at least one of polysilazane or silazane, and wherein the primer layer or the hard coating layer comprises a polymer resin including a silane structure.

9. The protective film structure of claim 1, wherein the hard coating layer has a thickness of 5 μm to 70 μm, a pencil hardness of at least 7 H, and a flexural strength of at least 2.0 R.

10. The protective film structure of claim 1, wherein at least a portion of the transparent adhesive layer comprises a lattice pattern having a length in a thickness direction of the transparent adhesive layer, wherein the lattice pattern has a line thickness of 100 nm to 10 μm, and wherein the lattice pattern comprises at least one of a straight pattern, a diagonal pattern, and a geometric mesh pattern.

11. The protective film structure of claim 10, wherein the lattice pattern has a line thickness of 100 nm to 5 μm.

12. The protective film structure of claim 11, wherein the lattice pattern has a line thickness of 100 nm to 1 μm.

13. The protective film structure of claim 1, wherein the primer layer and the hard coating layer comprise the polymer resin including the silane structure.

* * * * *